(12) United States Patent
Song et al.

(10) Patent No.: US 9,733,700 B2
(45) Date of Patent: Aug. 15, 2017

(54) RING-TYPE MOBILE TERMINAL

(71) Applicant: LG ELECTRONICS INC., Seoul (KR)

(72) Inventors: Heewook Song, Seoul (KR); Dawoon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/749,239

(22) Filed: Jun. 24, 2015

(65) Prior Publication Data

US 2016/0077582 A1 Mar. 17, 2016

(30) Foreign Application Priority Data

Sep. 15, 2014 (KR) .......................... 10-2014-0122240

(51) Int. Cl.

| | |
|---|---|
| G06F 3/01 | (2006.01) |
| G06F 3/0338 | (2013.01) |
| G06F 3/0484 | (2013.01) |
| G06F 3/0488 | (2013.01) |
| G06F 3/0362 | (2013.01) |
| G06F 3/0346 | (2013.01) |
| G06F 3/0354 | (2013.01) |

(52) U.S. Cl.
CPC .............. *G06F 3/011* (2013.01); *G06F 3/014* (2013.01); *G06F 3/017* (2013.01); *G06F 3/0338* (2013.01); *G06F 3/0346* (2013.01); *G06F 3/0362* (2013.01); *G06F 3/03547* (2013.01); *G06F 3/0484* (2013.01); *G06F 3/0488* (2013.01); *G06F 3/04883* (2013.01); *G06F 2203/0331* (2013.01)

(58) Field of Classification Search
None
See application file for complete search history.

(56) References Cited

U.S. PATENT DOCUMENTS

| 8,570,273 B1 | 10/2013 | Smith | |
|---|---|---|---|
| 2011/0007035 A1* | 1/2011 | Shai | G06F 3/014 345/179 |
| 2012/0075173 A1* | 3/2012 | Ashbrook | G06F 3/014 345/156 |

FOREIGN PATENT DOCUMENTS

| WO | WO 02/31758 A1 | 4/2002 |
|---|---|---|
| WO | WO 2009/024971 A2 | 2/2009 |

* cited by examiner

*Primary Examiner* — Kenneth B Lee, Jr.
(74) *Attorney, Agent, or Firm* — Birch, Stewart, Kolasch & Birch, LLP

(57) ABSTRACT

A ring-type terminal including a main body having a finger insertion space; a wheel surrounding the main body and being movable and rotatable on the main body; a touchscreen; and a controller configured to sense a rotated position of the wheel on the main body, display control graphic images on the touchscreen for controlling a function in response to the rotated position of the wheel being at a first position on the main body, receive a gesture input corresponding to a touch input on the touch screen or a moving of a finger wearing the ring-type terminal, in response to the rotated position of the wheel being at a second position on the main body, and deactivate the touchscreen in response to the rotated position of the wheel being at a third position on the main body.

17 Claims, 32 Drawing Sheets

RING-TYPE MOBILE TERMINAL

CROSS-REFERENCE TO RELATED APPLICATION

Pursuant to 35 U.S.C. §119(a), this application claims the benefit of earlier filing date and right of priority to Korean Application No. 10-2014-0122240, filed on Sep. 15, 2014, the contents of which are incorporated by reference herein in its entirety.

BACKGROUND OF THE DISCLOSURE

1. Field of the Disclosure

The present disclosure relates to a finger-wearable mobile terminal.

2. Background of the Disclosure

A terminal is broadly categorized by mobility into a mobile terminal and a stationary terminal. The mobile terminal is further categorized by portability into a handheld terminal and a vehicle-mounted terminal. In response to an increasing demand for diversified functions, the terminal has been realized in the form of a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

A wearable mobile terminal that is wearable on one portion of a human body is under development. A ring-type terminal is realized as a device for transmitting and receiving a control signal. Unlike in a mobile terminal that is wearable on a user's head or wrist, very fine and complex movements of a user's finger with a fingerprint are detected.

However, a currently realized ring-type terminal has a construction that is suitable for the simple insertion of the finger through the ring-type terminal, and thus is utilized as a simple control device that detects the control command when the ring-type terminals is worn on the user's finger.

SUMMARY OF THE DISCLOSURE

Therefore, an aspect of the detailed description is to provide a ring-type mobile terminal that can be controlled with movement and rotation of a wheel.

To achieve these and other advantages and in accordance with the purpose of this specification, as embodied and broadly described herein, the present invention provides in one aspect a ring-type terminal including a main body having a finger insertion space; a wheel surrounding the main body and being movable and rotatable on the main body; a touchscreen; and a controller configured to sense a rotated position of the wheel on the main body, display control graphic images on the touchscreen for controlling a function in response to the rotated position of the wheel being at a first position on the main body, receive a gesture input corresponding to a touch input on the touch screen or a moving of a finger wearing the ring-type terminal, in response to the rotated position of the wheel being at a second position on the main body, and deactivate the touchscreen in response to the rotated position of the wheel being at a third position on the main body.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A terminal in the present description includes a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc. However, the present invention may be also applicable to a fixed terminal such as a digital TV, a desktop computer and a digital signage, except for specific configurations for mobility.

Figure 1:
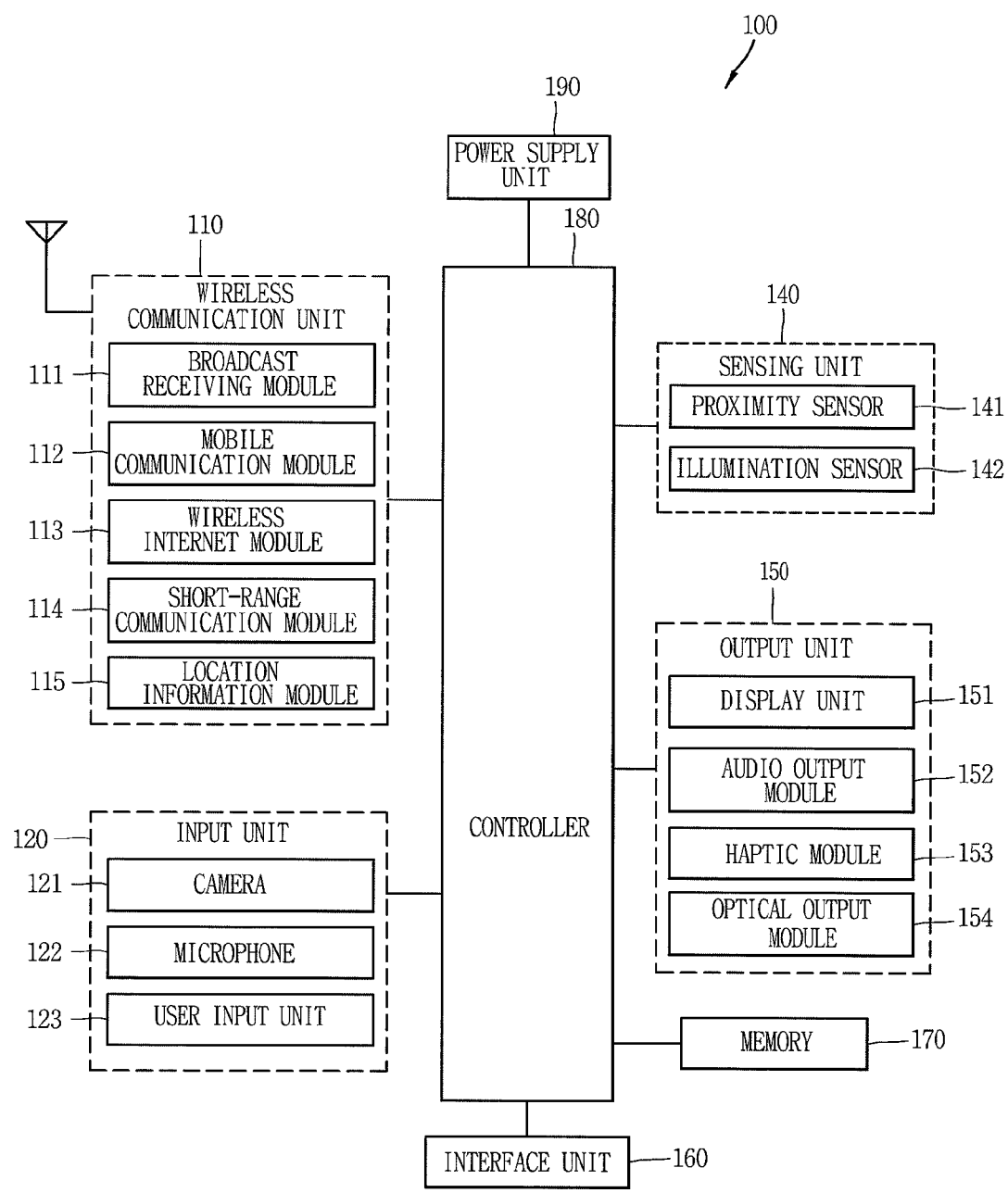
FIG. 1 is a block diagram illustrating a mobile terminal according to an embodiment of the present invention.

FIG. 1 is a block diagram of a mobile terminal in accordance with the present disclosure. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages. The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), Long Term Evolution (LTE), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The user input unit 123 may recognize information sensed by the sensing unit 140, as well as by the aforementioned mechanical input means and touch type input means, as information input from a user. Accordingly, the controller 180 can control an operation of the mobile terminal 100 corresponding to the sensed information.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen. The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region on the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like. The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

A method of controlling the mobile terminal with the configuration described above according to embodiments of the present invention is described below referring to the accompanying drawings. It is apparent to a person of ordinary skill in the art that modification, alteration, and improvement can be made to the present invention within a scope that does not depart from the nature and gist of the present invention. The present invention relates to a mobile terminal of which a main body can be equipped with a cover. The cover is formed in such a manner as to cover at least one region of a display unit.

Figure 2A:
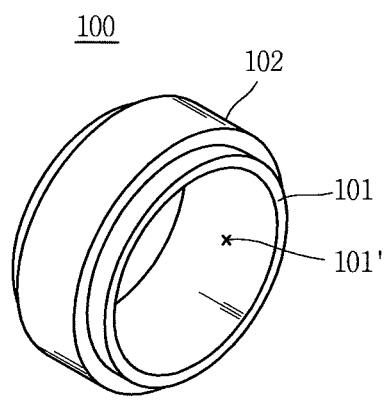
FIG. 2A is a diagram of a ring-type terminal according to one embodiment of the present invention when viewed from one direction.
Figure 2B:
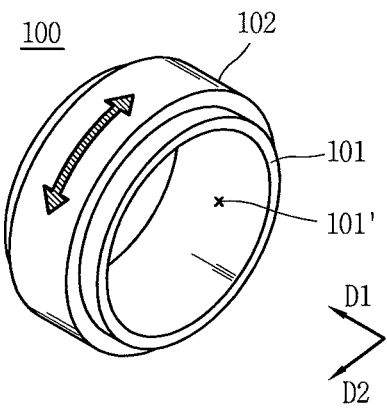
FIG. 2B(a) to 2B(c) are diagrams illustrating a method of controlling the ring-type terminal according to one embodiment of the present invention.
Figure 2B:
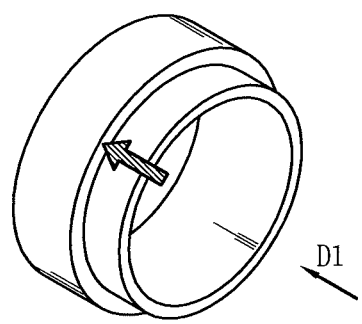
Figure 2B:
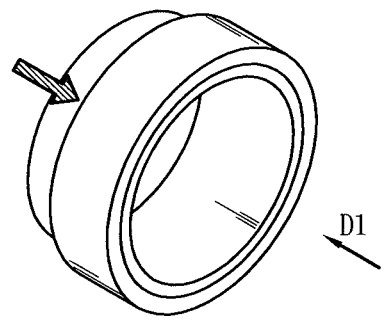

FIG. 2A is a diagram of a ring-type terminal according to one embodiment of the present invention, when viewed from one direction. FIGS. 2B(a) to 2B(c) are diagrams illustrating a method of controlling the ring-type terminal according to one embodiment of the present invention.

Referring to FIG. 2A, a ring-type terminal 100 according to one embodiment includes a ring-shaped body 101 and a wheel 102. The ring-shaped main body 101 has an insertion space 101' through which a finger is inserted. The wheel 102 is formed along an external circumferential surface of the main body 101 so the wheel 102 is rotatable and movable with respect to the main body 101.

The main body 101 is formed to have a given width w and a given thickness d. The width w and the thickness d of the main body 101 may not be fixed. Electronic components such as a user input unit that receives an input from a user and an output unit that outputs information are installed on the main body 101. The wheel 102 is formed so the width of the wheel 102 is smaller than the width w of the main body 101.

Referring to FIGS. 2B(a) to 2B(c), the rotation and the movement of the wheel 102 mounted on the main body 101 generates a control signal. The wheel 102 is rotatable with respect to the main body 101 and moves in a direction D1. In addition, referring to FIGS. 2B(a) and 2B(b), the movement of the wheel 102 by a given distance in the first direction D1 or in the direction opposite to the first direction D1 generates the control signal. The wheel 102 is formed so, when the user does not apply an external force to the wheel 102, the wheel 102 returns to one region of the main body 101.

A construction of the ring-type terminal 100 including the wheel 102 movably fixed to the main body 101 will be described in detail below. In particular, FIGS. 3A to 3C are partial cross-sectional diagrams illustrating a construction of the ring-type terminal according to various embodiments.

Figure 3A:
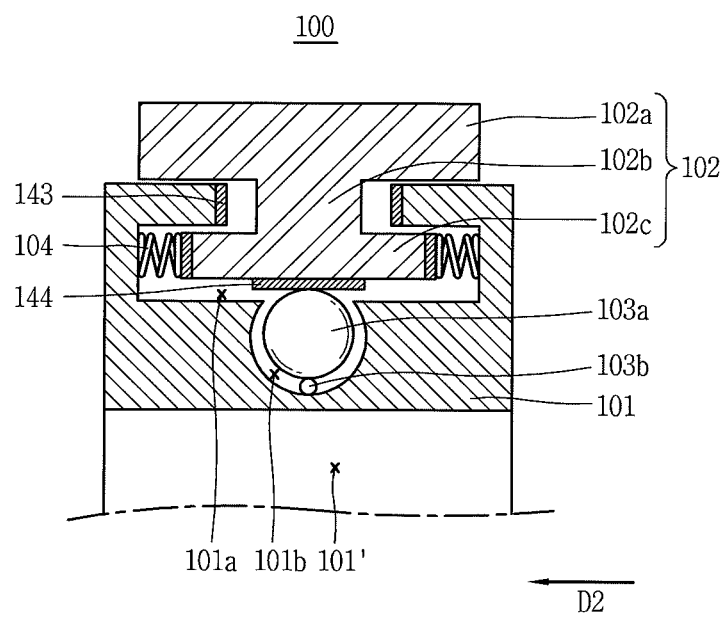
FIGS. 3A to 3C are partial cross-sectional diagrams illustrating a construction of the ring-type terminal according to various embodiments.
Figure 3B:
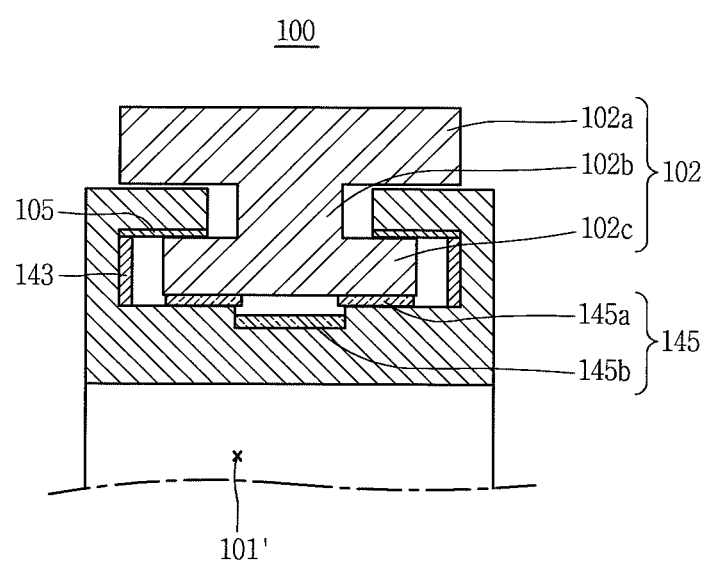
Figure 3C:
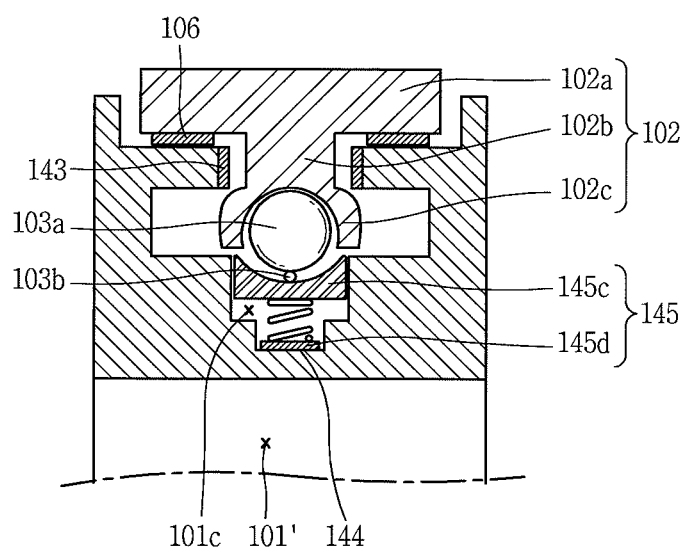

Referring to FIG. 3A, the ring-type terminal 100 includes the wheel 102, a rolling portion, an elastic portion 104, and first and second sensing units 143 and 144. The wheel 102 is mounted on the main body 101, and the rolling portion has first and second rotation rings 103a and 103b for rotating the wheel 102. The elastic portion 104 supports the movement of the wheel 102. The first and second sensing units 143 and 144 detect the rotation and the movement of the wheel 102.

In addition, the main body 101 includes first and second internal spaces 101a and 101b that communicate with each other. One portion of the wheel 102 is mounted in the first internal space 101a. Specifically, the wheel 102 includes a first portion 102a exposed to the outside at an external surface of the main body 101, and second and third portions 102b and 102c that are mounted in the first internal space 101a. The second portion 102b is formed so the width of the second portion 102b is smaller than that of the third portion 102c, and corresponds to shapes of the first and third portions 102b and 102c. Accordingly, the wheel 102 inserted into the first internal space 101a is not separated from the main body 101.

The ring-type terminal 100 includes the elastic portion 104 and the first sensing unit 143. Further, the elastic portion 104 supported by the main body 101 elastically supports the third portion 102c for moving the wheel 102 in the first direction D1 and the direction opposite to the first direction D1. The first sensing unit 143 detects the movement of the wheel 102.

The elastic portion 104 is configured from elastic members in a pair that are mounted on both lower lateral surfaces, respectively, of the wheel 102 that moves in the second direction. The elastic members in a pair, which are supported by the internal surface of the main body 101, support the third portion 102c of the wheel 101 in the internal space 101a. Therefore, the third portion 102c of the wheel 102 is elastically supported so the third portion 102c is positioned in the middle of the first internal space 101a.

Referring to FIGS. 2B(b) and 2B(c), even though the application of the external force by the user moves the wheel 102 in the first direction D1, when the application of the external force by the user stops, the elastic portion 104 returns the wheel 102 to its original position.

The movement of the wheel 102 is detected by the first sensing unit 143. When the wheel 102 moves in the first direction D1, the first sensing unit 143 is mounted on an internal surface of the main body 101, which comes into contact with the second portion 102b of the wheel 102. The first sensing unit 143 includes a detection sensor that generates an electrical signal due to collision (or contact) with the second portion 102b. Further, the first sensing unit detects a change in a position of the wheel 102 over time.

In addition, the ring-type terminal 100 includes the first and second rotation rings 103a and 103b in order to rotate the wheel 102, and includes the second sensing unit 144 in order to detect the rotation of the wheel 102. The first and second rotation ring 103a and 103b are sphere-shaped and have different diameters. The first and second rotation rings 103a and 103b are accommodated in the second internal space 101b in the main body 101. The second internal space 101b extends along a shape of the main body 101 and a cross section of the second internal space 101b is circular. A cross section of the second rotation ring 103b is formed to be smaller than that of the first rotation ring 103a.

The first rotation ring 103a is ring-shaped and is fixed to the third portion 102c. The rotation of the wheel 102 causes the first rotation ring 103a to rotate with respect to the second rotation ring 103b. Further, the first and second rotation rings 103a and 103b may be sphere-shaped, instead of being ring-shaped.

In addition, the second sensing unit 144 detects the rotation of the wheel 102. The second sensing unit 144 is mounted on the third portion 102c, but a position of the second sensing unit 144 is not limited to the third portion 102c. The second sensing unit 144 also detects whether or not the wheel 102 rotates and detects a direction in which the wheel 102 rotates.

According to the present embodiment, the elastic portion 104 supported by the main body 101 elastically supports the wheel 102. Thus, when the user applies to the external force to the wheel 102, the wheel 102 moves. When the user stops applying the external force, the wheel 102 returns to its original position. Accordingly, instead of pushing down a button, the user moves the wheel 102 to generate a control command.

Referring to FIG. 3B, the ring-type terminal 100 according to the present embodiment includes the main body 101, the wheel 102, the first sensing unit 143, a third sensing unit 145, and an impact-absorbing portion 105.

The main body 101 includes the first internal space 101a and the second and third portions 102a and 102b of the wheel 102 are accommodated in the first internal space 101a. Further, the wheel 102 is rotatable on the main body 101, and is movable in the direction opposite to the first direction D1. The main body 101 and the wheel 102 are substantially the same as the main body 101 and the wheel 102 of the ring-type terminal 100, respectively, that are described referring to FIG. 3A, in terms of shape and function, and thus descriptions of them are omitted.

In addition, the first sensing unit 143 is mounted on the internal surface of the main body 101 that faces the third portion 103c in order to detect the movement of the wheel 102. When both ends of the third portion 103c that extends in the first direction D1 come into contact with the first sensing unit 143, the first sensing unit 143 detects this and determines the wheel 102 moves. However, a position of the first sensing unit 143 is not limited to the internal surface of the main body 101 that faces the third portion 103c, and the first sensing unit 143 may be mounted on the internal surface of the main body 101 that the second portions 102b can come into contact with.

In addition, the third sensing unit 145 is mounted under the third portion 102c and includes a pair of magnetic sensors 145a and a magnet 145b. For example, the magnetic sensors 145a in a pair are arranged on a lower surface of the third portion 102c so the magnetic sensors 145a are positioned a distance from each other along the first direction D1. In addition, when the wheel 102 is positioned in the middle of the main body 101, the magnet 145b is formed on an internal surface of the main body 101 so the magnet 145b corresponds to a space between the magnetic sensors in the pair.

Accordingly, when the wheel 102 moves, any of the magnetic sensors 145a in the pair selectively approaches the magnet 145b. Accordingly, with the magnetic sensor 145a that detects a change in magnetism, the movement of the wheel 102 and the direction in which the wheel 102 moves are detected.

In addition, the impact-absorbing portion 105 is mounted on the internal surface of the main body 101 that faces an upper surface of the third portion 102c. That is, the impact-absorbing portion 105 is mounted between the third portion 102c and the main body 101, and absorbs an impact of the wheel 102 on the main body 101 while the wheel 102 moves along the first direction D1. In addition, the impact-absorbing portion 105 provides frictional force between the main body 101 and the wheel 102. Accordingly, the wheel 102 maintains a state where the wheel 102 moves with respect to the main body 101.

According to the present embodiment, the movement and the rotation of the wheel 102 are detected by the sensing unit mounted on each of the internal surface of the main body 101 and the wheel 102, and this makes it possible to decrease the number of components. Thus, the internal space is advantageously used, and the weight of the ring-type terminal 100 is minimized.

Referring to FIG. 3C, the ring-type terminal 100 according to the present embodiment includes a main body 100, the wheel 102, the first and second rotation ring 103a and 103b, an elastic support unit 145, the first and second sensing units 143 and 144, and a prevention unit 106. Constituent elements are substantially the same as those of the ring-type terminal 100 in FIG. 3A except for the shape of the wheel 102, the elastic support unit 145 and the prevention unit 106, and thus the same constituent elements are given the reference numerals and descriptions of them are omitted.

In addition, the first sensing unit 143 is mounted on the internal surface of the main body 101 that faces the second region 102b and thus detects the movement of the wheel 102. The second sensing unit 144 is arranged under the wheel 102 and thus detects the movement of the wheel 102. Further, the wheel 102 according to the present embodiment includes the first portion 102a, the second portion 102c, and a fourth portion 102d. The first portion 102a is exposed to the outside.

In addition, the second portion 102c is accommodated in the first internal space 101a and has a smaller width of cross section than that of the first portion 102a. The fourth portion 102d extends from the second portion 102c. A groove is formed in the end portion of the fourth portion 102d. Further, the ring-type terminal 100 includes the first rotation ring 103a formed to be inserted into the groove. The groove is formed to surround one portion of an external surface of the first rotation ring 103a.

In addition, the main body 100 includes a third internal space 101c that communicates with the first internal space 101a. The elastic support unit 145 is accommodated in the third internal space 101c, and elastically supports the first rotation ring 103a and the second rotation ring 103b where the elastic support unit 145 is accommodated in the third internal space 101c. The elastic support unit 145 also includes an elastic member 145d that provides an elastic force, and a support member 145c formed on the elastic member 145d.

Further, the first rotation ring 103a is arranged between the support member 145c and the groove in the fourth portion 102d and is fixed to the support member 145c. The groove corresponding to the external surface of the first rotation ring 103a is formed by recessing the fourth rotation ring 103b. One support member 145c is recessed to form a curved surface corresponding to the external surface of the first rotation ring 103a. In addition, the elastic member 145d prevents the first rotation ring 103a from escaping from a space between the support member 145c and the groove.

When the wheel 102 moves in the first direction D1, with the groove, the first rotation ring 103a moves along the wheel 102. The first rotation ring 103a also moves toward an edge of the curved surface of the support member 145c and the support member 145c is forced in the direction of the middle of the ring-type terminal due to the shape of the support member 145c and the shape of the first rotation ring 103a.

Further, the elastic member 145d continues to provide a restoring force to the wheel 102 that moves. Accordingly, when the external force is stopped by the user, with the elastic force of the elastic member 145d, the first rotation ring 102a moves toward the middle of the support member 145c. Then, due to the groove in the fourth portion 102d, which is formed to surround the first rotation 102a, the wheel 102 returns to its original position.

In addition, the prevention unit 106 is arranged between a lower surface of the first portion 102a and one surface of the main body 101. In more detail, the prevention unit 106 prevents contaminants from being introduced into the internal space in the main body 101. Further, the elastic member 145d provides the elastic force to the ring-type terminal 100 according to the present embodiment in a direction in which the wheel 102 moves away from the main body 101. Thus, a space is formed between the first portion 102a and the main body 101. The prevention portion 106 is formed in the space in order to prevent the contaminants from being introduced.

Figure 4A:
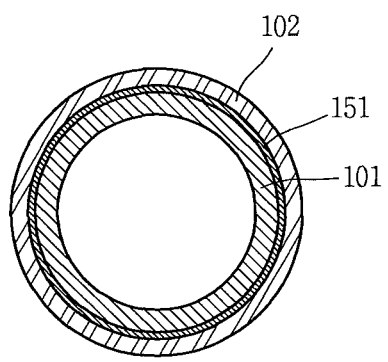
FIGS. 4A(a) to 4C(b) are diagrams illustrating the construction of the ring-type terminal including a display unit.
Figure 4A:
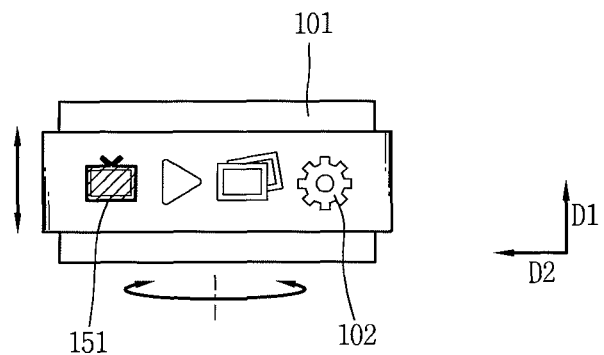

With the rotation of the wheel 102, the ring-type terminal according to an embodiment of the present invention switches between modes in order to drive the ring-type terminal. A method of controlling the mode of driving the ring-type terminal with the rotation of the wheel 102 will be described in detail below. In particular, FIGS. 4A(a) to 4C(b) are diagrams illustrating the ring-type terminal including a display unit;

Referring to FIGS. 4A(a) to 4A(b), a display unit 151 is mounted between the main body 101 and the wheel 102 in the ring-type terminal 100. The display unit 151 is mounted along an external circumferential surface of the main body 101 and has a closed loop.

In addition, the wheel 102 is made of transparent material. Accordingly, through the wheel 101 of the ring-type terminal, the user can recognize an image output on the display unit 151. The wheel 102 may be entirely made of transparent material, but is not limited to this material, and includes a print portion of the display unit 151, and an edge of the display unit 151, on which information is displayed, may be made of transparent material.

Figure 4B:
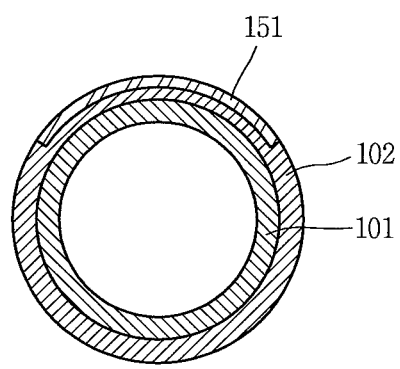
Figure 4B:
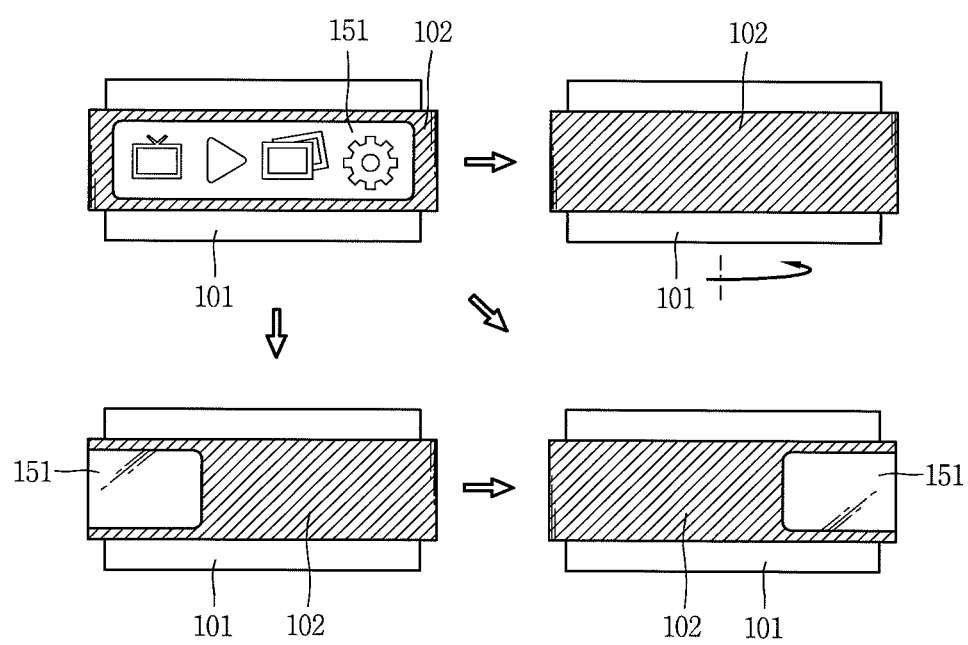

When a mode switches due to the rotation of the wheel 102, the controller 180 of the ring-type terminal according to the present embodiment controls the display unit 151 so an image corresponding to the mode is output. Referring to FIGS. 4B(a) and 4B(b), the ring-type terminal including the main body 101, the display unit 151, and the wheel 102 is described. The display unit 151 is mounted on one region of the wheel 102. For example, a mount portion is formed by recessing one portion of an external circumferential surface of the wheel 102, and the display unit 151 is inserted into the mount portion. Accordingly, an external surface of the display unit 151 and an external surface of the wheel 102 are on the same level. The display unit 151 according to an embodiment of the present invention further includes a touch sensor that receives a user touch input.

Referring to FIG. 4B(b), with the rotation of the wheel 102, the controller 180 drives the ring-type terminal 100 in different modes. In particular, the controller 180 activates a first mode where all regions of the display unit 151 can be viewed by the user. In addition, a region of the display unit 151, which can be viewed by the user, corresponds to one region of the ring-type terminal recognized by the user wearing the ring-type terminal 100 when viewed from one direction.

Further, the first mode corresponds to generating a control command based on the user touch input applied to the display unit 151. In particular, the controller 180 controls the display unit to display a given image in the first mode. In addition, the user touch input is applied to the image.

When the wheel 102 rotates to a given extent and thus one region of the display unit is recognized by the user, the controller 180 activates a second mode. For example, if in the first mode, the wheel 102 rotates by approximately 90 degrees, and when half of the regions of the display unit 151 are recognized by the user, the second mode is activated.

In the second mode, the controller 180 controls a gesture sensing unit so a user gesture is detected. In addition, the controller 180 receives the touch input applied to the display unit 151, and limits the output of the image to the display unit 151. In this instance, the controller 180 generates a control command according to the detection of the gesture made with a user's hand due to the movement of the ring-type terminal 100 and the touch input applied to the display unit 180.

Further, when the wheel 102 is rotated by approximately 180 degrees so the display unit 151 is not viewed by the user, the controller 180 switches to a third mode defined as an inactivated state. For example, the controller 180 inactivates the detection of the gesture, and performs control so the touch input applied to the display unit 151 is no longer received. That is, the user can drive the ring-type terminal 100 in different modes by rotating the wheel 102 with respect to the display unit 151.

Figure 4C:
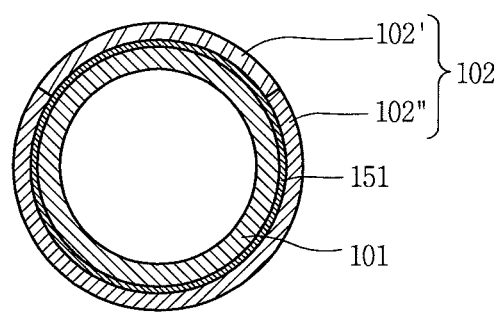
Figure 4C:
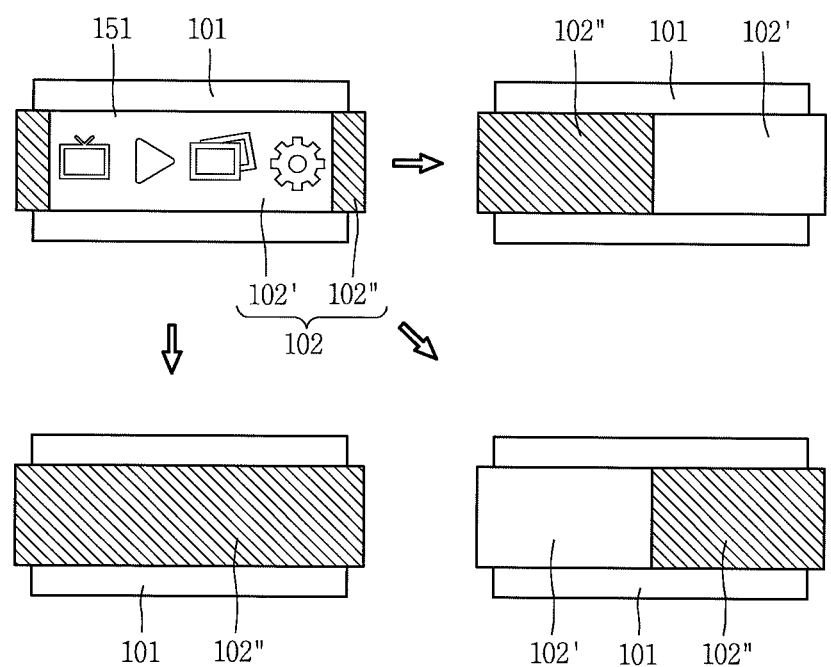

Referring to FIGS. 4C(a) and 4C(b), the ring-type terminal 100 according to another embodiment including the main body 101, the display unit 151, and the wheel 102 is described. The display unit 151 according to the present embodiment mounted to the external circumferential surface of the main body 101 has a closed loop. First to third modes according to the present embodiment are substantially the same as those described referring to FIGS. 4B(a) and 4B(b), respectively, and descriptions of the modes are omitted.

In addition, the wheel 102 according to the present embodiment includes a first portion 102' made of a transparent material, and a second portion 102" made of a non-transparent material. An image is output to the display unit 151 through the first portion 102'.

Referring to FIG. 4C(b), in the first mode, the first portion 102' is entirely recognized by the user, and an image output to the display unit 151 is provided to the user through the first portion 102'. When in the first mode, and the wheel 102 rotates by 90 degrees, the first mode switches to the second mode. In addition, in the second mode, one segment of the first portion 102' is recognized by the user, and the image output to the display unit 151 is provided to the user through the one segment.

When the second mode is activated, the output of the image to the display unit 151 is limited or current time information is output to the display unit 151. In addition, in the second mode, the time information is output to only one region of the display unit 151, which corresponds to the first portion 102'. Further, when the wheel 102 rotates by approximately 180 degrees in the first mode, the third mode is activated. In the third mode, the user can recognize the second portion 102".

Thus, the ring-type terminal according to the present embodiment switches to a mode in which different control commands are generated, depending on the extent to which the wheel 102 rotates. In addition, the ring-type terminal switches to the inactivated state while the user wears the ring-type terminal, and thus an unintended control command is prevented from being generated due to the movement of the ring-type terminal that results from the movement of the user's hand and due to the touch input.

The controller 180 also detects the rotation of the wheel 102, and activates any one of the first to third modes. The ring-type terminal 100 according to one embodiment may include a recognition module that, for the user, recognizes a point in time at which switching occurs between the modes. A construction of the recognition module will be described in detail below. In particular, FIGS. 5A to 5C are diagrams illustrating a recognition module according to various embodiments.

Figure 5A:
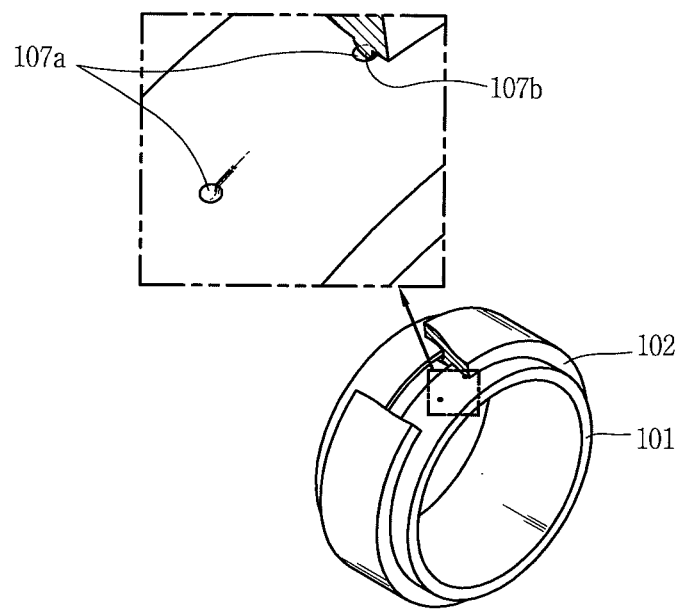
FIGS. 5A to 5C are diagrams illustrating a recognition module according to various embodiments.

Referring to FIG. 5A, the recognition module includes a groove 107a formed in the external circumferential surface of the main body 101, and a protrusion 107b formed in an internal circumferential surface of the wheel 102. Further, the recognition module includes multiple grooves 107a. For example, the recognition module includes four grooves 107a that correspond to the first mode, the second mode activated with the rotation of the wheel 102 to the left or to the right, and the third mode, respectively.

When the protrusion 107 is inserted into the groove 107a while the wheel 102 rotates, the user gets a feeling that the protrusion 107b is inserted into the groove 107a. Accordingly, the user can rotate the wheel 102 to switch between the modes until the user gets the feeling that the protrusion 107b is inserted into the groove 107a.

Figure 5B:
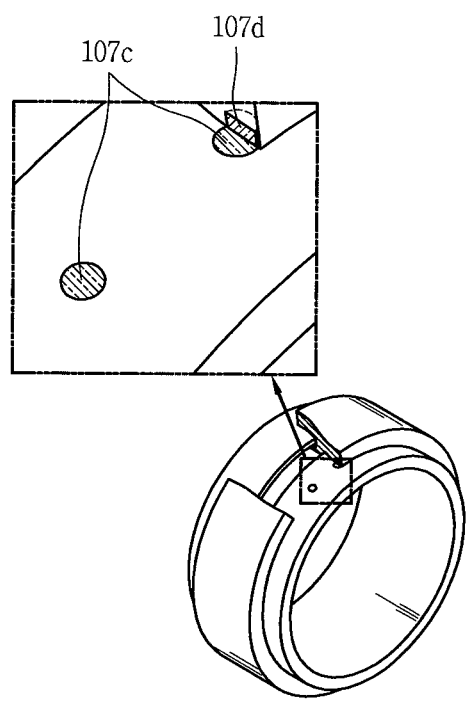
Figure 5C:
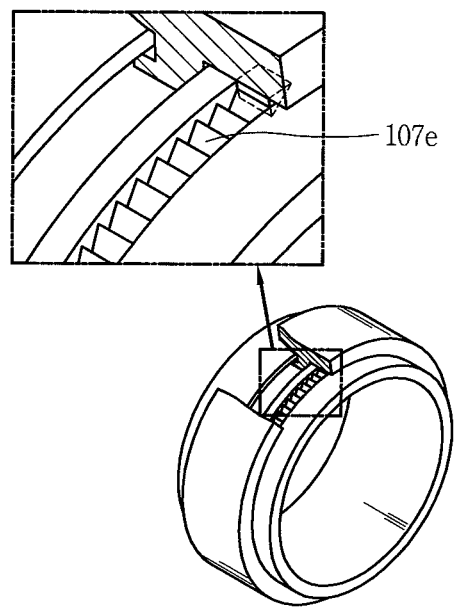

In addition, the ring-type terminal 100 including the recognition module having magnets is described referring to FIG. 5B. The recognition module includes a positive-polarity first magnet 107c mounted on the external circumferential surface of the main body 101, and a negative-polarity second magnet 107d mounted on the internal circumferential surface of the wheel 102. The recognition module includes four first magnets 107c that correspond to the first mode, the second mode activated with the rotation of the wheel 102 to the left or to the right, and the third mode, respectively.

When a force of attraction occurs between the positive-polarity magnet and the negative-polarity, the user can detect that the wheel 102 rotates. In addition, the recognition module according to the present embodiment does not result from a mechanical construction, and thus facilitates the rotation of the wheel 102.

The recognition module 107e that takes the form of a saw is described referring to FIG. 5C. A recognition module 107e according to the present embodiment includes a saw-toothed portion of an external circumferential surface of the main body 101 and a protrusion corresponding to the saw-toothed portion. Multiple grooves in which the protrusion is inserted are formed in the remainder of the external circumferential surface of the main body 101. For example, the recognition module 107e is formed in only the portion corresponding to the second mode. Thus, when the second portion is activated, the user can sense the collision with the saw-toothed segment.

Further, the wheel 102 according to the present embodiment rotates along one direction. In particular, FIGS. 6A(a) to 6B (c) are diagrams illustrating a method of controlling the ring-type terminal in different modes. That is, FIGS. 6A(a) to 6A(c) are diagrams illustrating the method of controlling the ring-type terminal according to a mode when the ring-type terminal is worn on a finger, and FIGS. 6B(a) to 6B(c) are diagrams illustrating a method of controlling the ring-type terminal according to each mode when the ring-type terminal 100 connects wirelessly to a mobile terminal 200.

Figure 6A:
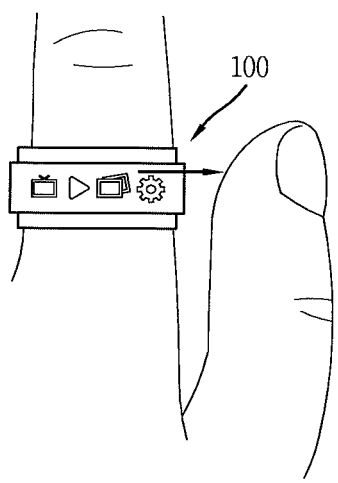
FIGS. 6A(a) to 6B(c) are diagrams illustrating a method of controlling the ring-type terminal in different modes.
Figure 6A:
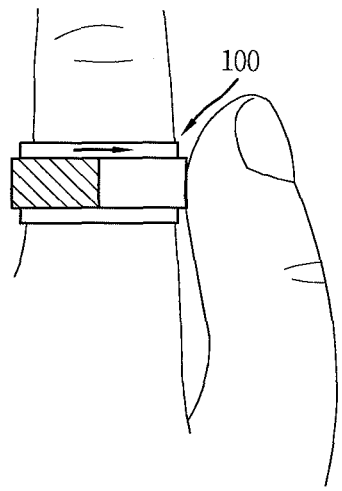
Figure 6A:
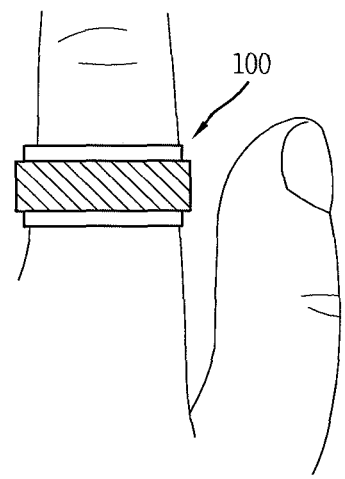
Figure 6B:
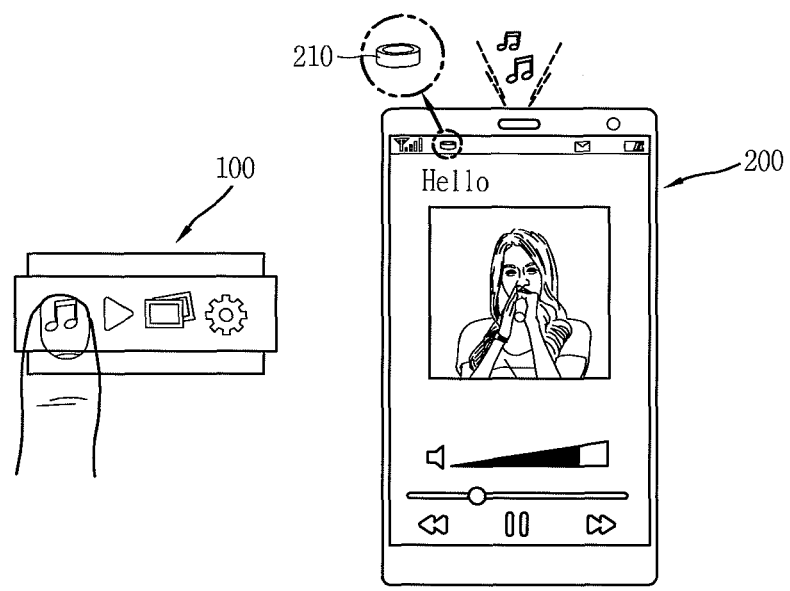
Figure 6B:
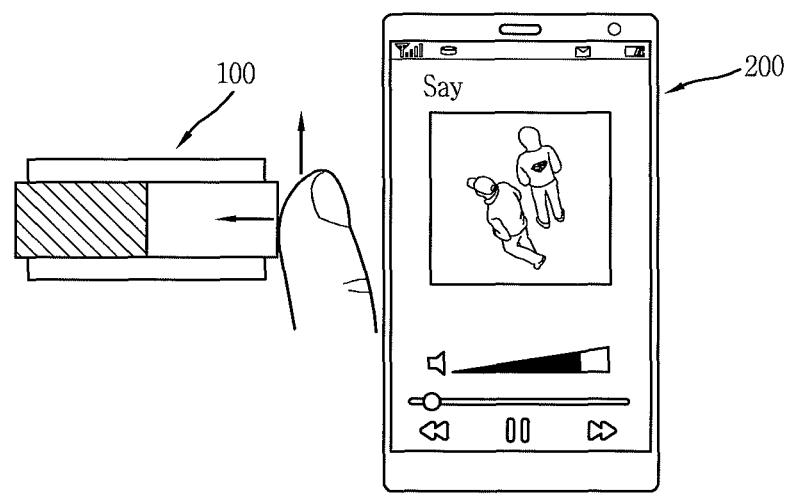
Figure 6B:
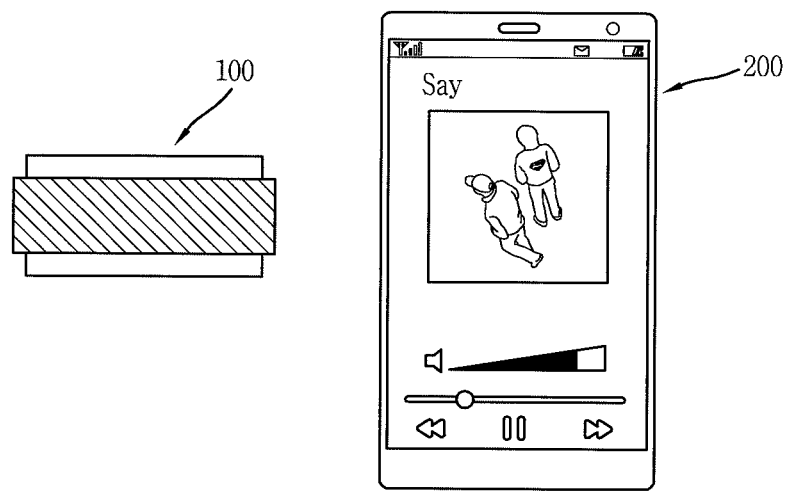

As illustrated in FIGS. 6A(a) and 6B(a), in the first mode, the controller 180 controls the display unit 151 so an image is output in order to receive the user touch input. In addition, when a display module of the mobile terminal 200 connects wirelessly to the ring-type terminal 100, a graphic image 210 indicating this is output to the display module. In addition, with the touch input applied to the display unit 151, the controller 180 controls the wireless communication unit 110 so a control command for controlling the mobile terminal 200 is transmitted.

For example, when an icon of a music playback application displayed on the display unit 151 receives the touch input, the controller 180 controls the wireless communication unit 110 so a control command for executing the application is transmitted to the mobile terminal 200.

Referring to FIGS. 6A(b) and 6B(b), with the application of the external force by the user rotating the wheel 102 by approximately 90 degrees in one direction, the controller 180 activates the second mode. With the successive application of the touch input to the display unit 151 in the second mode, the controller 180 generates the control command. For example, with the successive application of the touch input to the display unit 151 in one direction, the controller 180 generates a control command for adjusting a sound volume of music output or adjusting playback of the music. That is, in the second mode, the display unit 151 is used as a touch pad.

In this instance, the output of the image to the display unit 151 is limited, or current time information is output to the display unit 151. Referring to FIGS. 6A(c) and 6B(c), when the wheel 102 further rotates by approximately 90 degrees in one direction in the second mode, the controller 180 switches to the third mode that is the inactivated mode. In the third mode, neither the touch input applied to the display unit 151 is received, nor a control command is generated when the user wearing the ring-type terminal 100 moves.

In this instance, the ring-type terminal 100 prevents the wireless connection to the mobile terminal 200, and the output of the graphic image 210 corresponding to the ring-type terminal to the display module of the mobile terminal 200 is stopped. Accordingly, the user can conveniently switch between modes, and can generate many more control commands. In addition, a problem of generating an unintended control command while the ring-type terminal is worn is prevented.

Figure 7A:
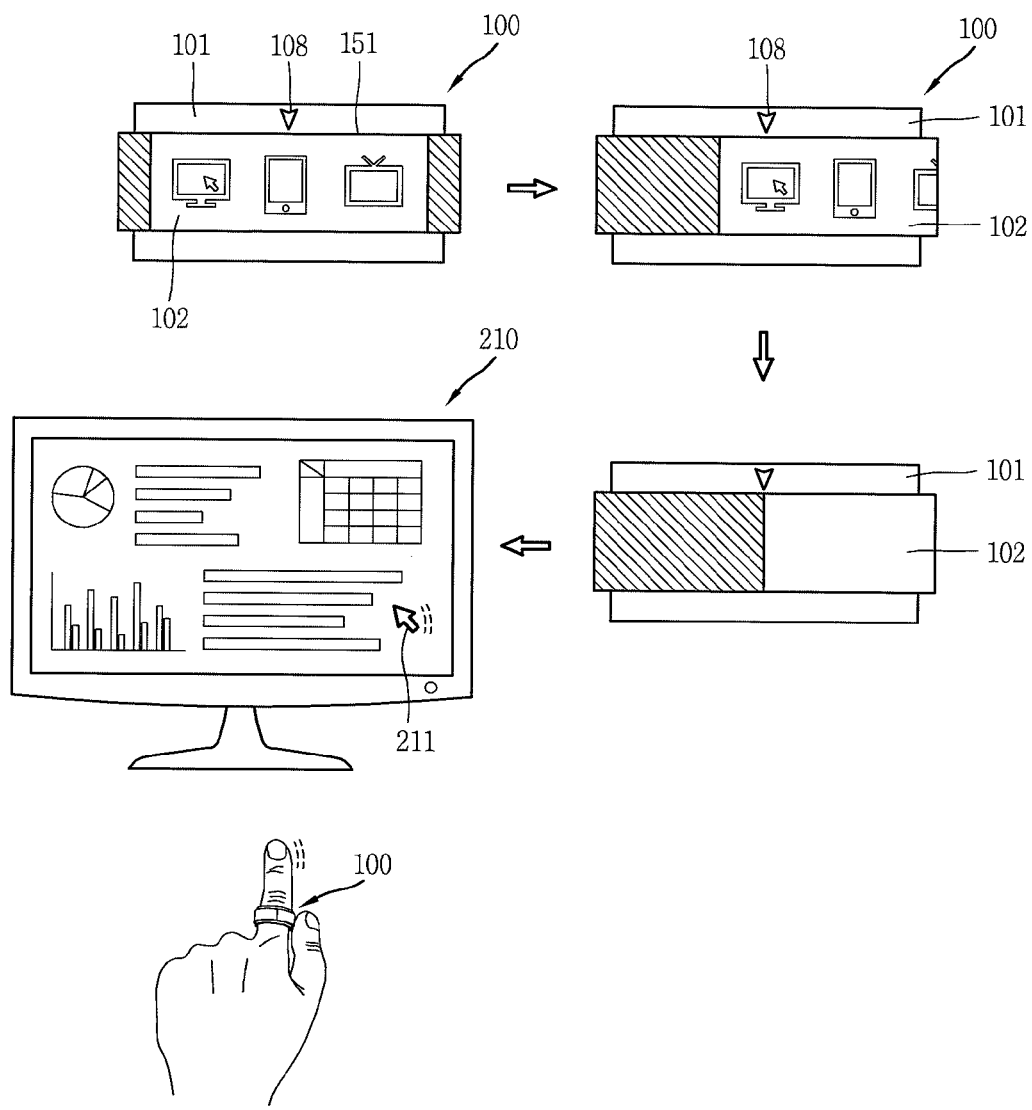
FIGS. 7A to 7C are diagrams illustrating the method of controlling the ring-type terminal in each mode.
Figure 7B:
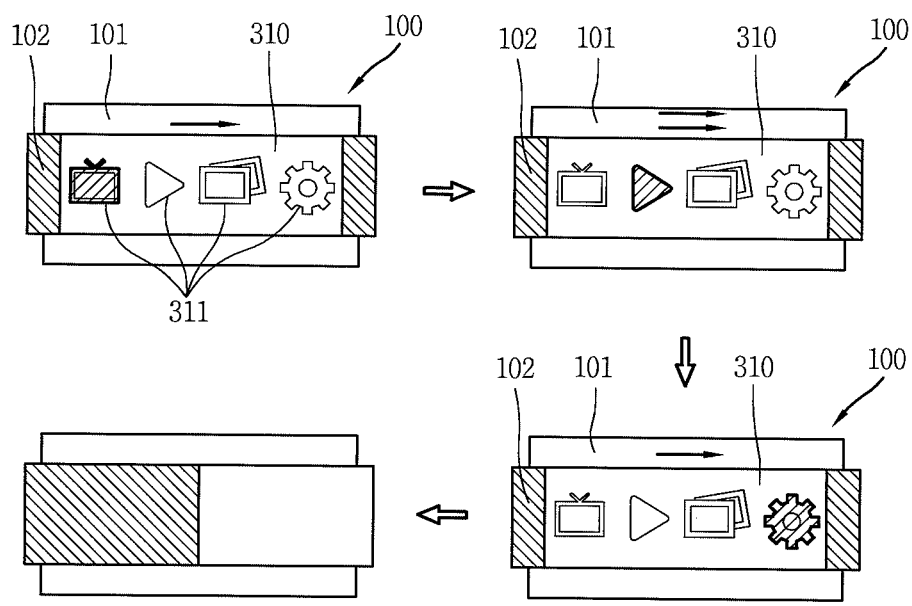
Figure 7C:
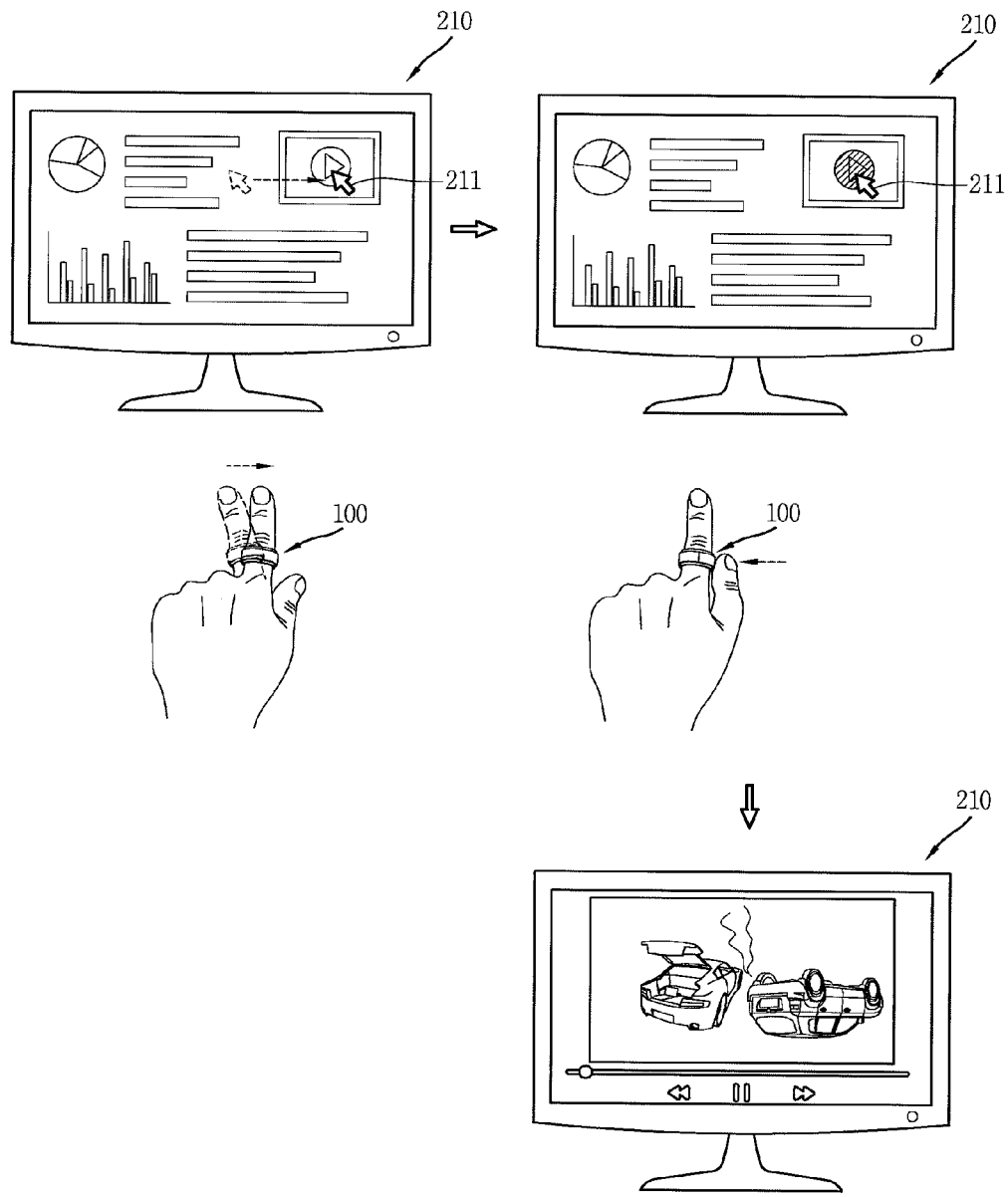

Next, FIGS. 7A to 7C are diagrams illustrating the method of controlling the ring-type terminal in each mode. Referring to FIG. 7A, in the first mode, an image 102 is output to the display unit 151. The image 102 indicates multiple external apparatuses, the wireless connection to which is possible, and includes multiple icons arranged in one direction.

In addition, an indicator 108 is formed on the external circumferential surface of the main body 101, which is adjacent to an edge of the wheel 102. The controller 180 controls the wireless communication unit 110 so, among external apparatuses that are indicated by the multiple icons, the wireless connection to an external apparatus positioned adjacent to the indicator 108 is established.

When the user rotates the wheel 102, and with the movement of the display unit 151 or of the first portion 102' made of transparent material, one of the multiple icons included in the image 102 moves adjacent to the indicator 108, and the controller 180 controls the wireless communication unit 110 so the wireless communication with an external apparatus corresponding to an icon adjacent to the indicator 108 is performed.

Further, with the rotation of the wheel 102, the indicator 108 indicates an edge of the display unit 151 or a border between the first portion and the second portion, and then the controller 180 switches the first mode to the second mode. In addition, the controller 180 controls the display unit 151 so the output of the image is limited.

When the second mode is activated, the controller 180 activates the gesture sensor to sense the movement of the user's hand (or the user's finger). In addition, when the display unit 151 receives the touch input, the controller 180 generates a control command based on this. According to the present embodiment, with the indicator 108, the user can understand an icon to be selected (and an external device corresponding to the icon) in a more precise manner. Further, the user can control a cursor 211 by moving their thumb, for example, on the wheel in the direction shown in FIG. 7A, for example, A control method of selecting a menu with the rotation of the wheel 103 in the first mode is described referring to FIG. 7B. First screen information 310 including multiple icons 311 corresponding to multiple menus, respectively, is output to the display unit 151. For example, the icons 311 correspond to multiple external apparatuses that can wirelessly connect to the ring-type terminal 100, respectively.

An icon displayed on the display unit 151, which is currently selected from among the multiple icons 311 for the wireless connection to the ring-type terminal is highlighted. With the rotation of the wheel 102, the controller 180 selects other icons from among the multiple icons, and highlights the selected icon.

For example, when the wheel 102 rotates to the right, the controller 180 selects an icon that is positioned to the right. The controller 180 selects the icon, depending on the number of times that the wheel 102 rotates and the extent to which the wheel 102 rotates. When the wheel 102 rotates so an icon that is positioned farthest is selected from among the multiple icons, the controller 180 switches the first mode to the second mode.

According to the present embodiment, the user can execute a desired function with the indicator 108 or on a change in the output to the display unit 151. The control method of selecting the external apparatus for the wireless connection to the ring-type terminal 100 is described as one example referring to the drawings, but the function corresponding to the icon is not limited to this.

Next, a control method of controlling the ring-type terminal 100 in the second mode is described referring to FIG. 7C. The ring-type terminal 100 can connect wirelessly to an external apparatus 210 and the external apparatus can correspond to a TV set. When the second mode is activated, the external apparatus 210 outputs a cursor 211 controlled by the ring-type terminal. When the second mode is activated, the controller 180 activates the gesture detection sensor. Accordingly, the curser 211 moves corresponding to a path along which the ring-type terminal 100 moves or a path along with the user's finger moves.

In addition, when the second mode is activated, the controller 180 controls the display unit 151 so the user touch input is received. The controller 180 detects the gesture, and receives the user touch input, thereby generating the control command. When the touch input is received in a region of the external apparatus 210, at which the cursor 211 is positioned, the controller 180 performs a function corresponding to the region at which the cursor 211 is positioned.

Figure 8A:
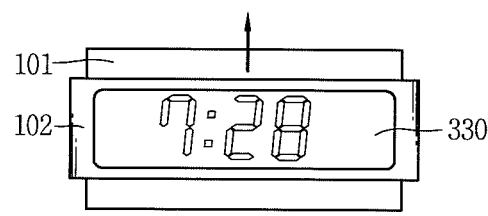
FIGS. 8A(a) to 8D(d) are diagrams illustrating a control method that uses a wheel in a first mode.
Figure 8A:
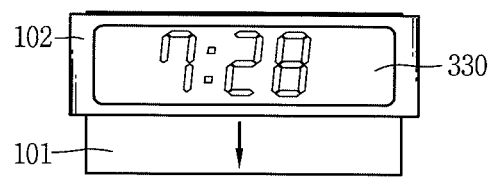
Figure 8A:
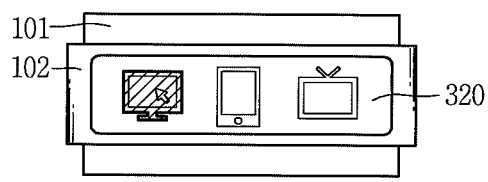

Next, FIGS. 8A(a) to 8D(d) are diagrams illustrating a control method that uses a wheel in a first mode. A control method of outputting screen information for connecting the ring-type terminal 100 to an external apparatus is described referring to FIGS. 8A(a) to 8A(c). Referring to FIG. 8A(a), third screen information 330 is output to the display unit 151. For example, the third screen information 330 indicates the current time. When the display unit 151 is activated, the controller 180 controls the display unit 151 so the third screen information 330 is output.

When the wheel 102 moves with respect to the main body 101, the controller 180 controls the display unit 151 so the third screen information 330 is changed to second screen information 320. The second screen information 320 includes multiple icons for selecting external apparatuses that can connect wirelessly to the ring-type terminal 100. Referring to FIGS. 3A to 3C, with the elastic portion 104 and the elastic member 145d, the wheel 102 moves back to the middle of the main body 101. Referring to FIG. 3B, with the application of the external force by the user, the wheel 102 moves to the middle of the main body 101. When the wheel 101 moves to the middle of the main body 102, the controller 1870 controls the display unit 151 so the second screen information 320 is output.

Figure 8B:
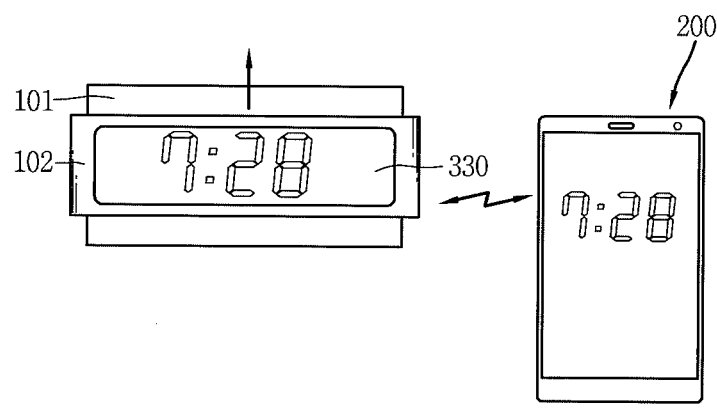
Figure 8B:
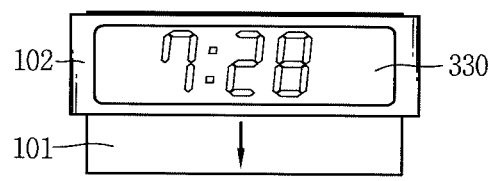
Figure 8B:
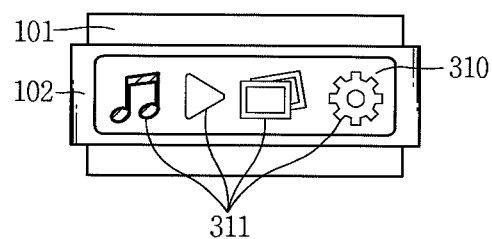

Next, FIGS. 8B(a) to 8B(c) illustrates a control method where the ring-type terminal 100 and the mobile terminal 200 connect wirelessly to each other. When the wheel 102 moves in one direction with respect to the main body 101, the controller 180 controls the display unit 151 to display the first screen information 310 for controlling a function of the mobile terminal 200. The first screen information 310 includes at least one function of the mobile terminal 100.

A direction in which the wheel 102 moves is substantially the same as that in which the wheel 102 moves in FIGS. 8A(a) to 8A(c) in order to output the second screen information 320. For example, the icons include an icon for receiving the touch input to execute an application installed on the mobile terminal 200, an icon for receiving a control command to change a setting of the mobile terminal 200, and the like. Accordingly, screen information for controlling the ring-type terminal 100, which differs depending on whether or not the ring-type terminal 100 connects wirelessly to an external apparatus is output to the display unit 151.

Figure 8C:
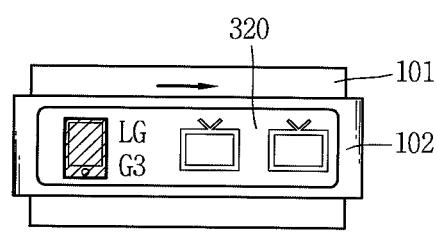
Figure 8C:
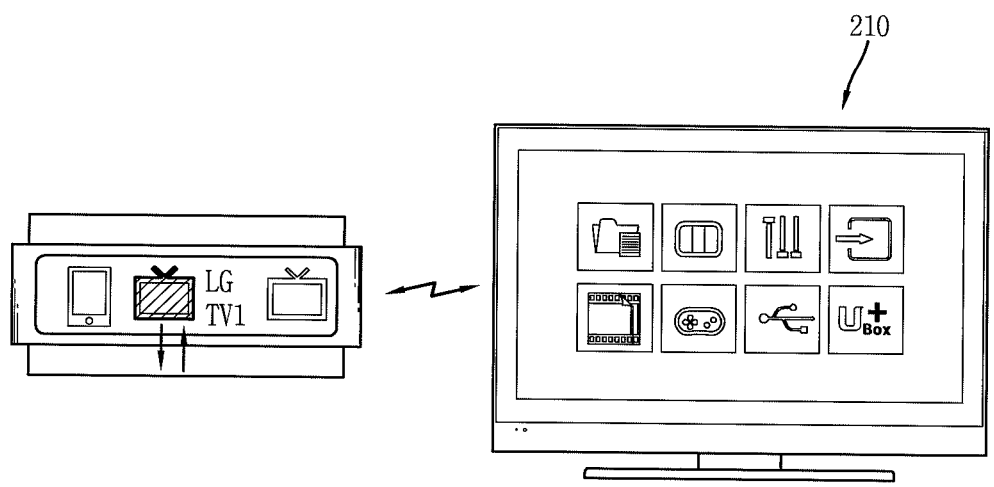

Next, FIGS. 8C(a) and 8C(b) illustrate a control method of selecting an external apparatus to be wirelessly connected. When, as illustrated in FIG. 8A(a) to 8A(c), the ring-type terminal 100 does not connect wirelessly to an external apparatus, and with the movement of the wheel 102, the controller 180 outputs the second screen information 320 for selecting an external apparatus to be wirelessly connected.

With the rotation of the wheel 102, the controller 180 selects any one from among icons included in the second screen information 320. In addition, information on an external apparatus 210 corresponding to the selected icon is additionally output to the display unit 151. When the icon corresponding to the external apparatus 210 is selected, the controller 180 controls the wireless communication unit 110 so the wireless communication with the selected external apparatus 210 is performed according to the movement of the wheel 102 in a specific direction. That is, according to the present embodiment, with the rotation of the wheel 102, any one is selected from among the multiple icons, and with the movement of the wheel 102, control is performed so a function corresponding to the selected icon is performed.

Figure 8D:
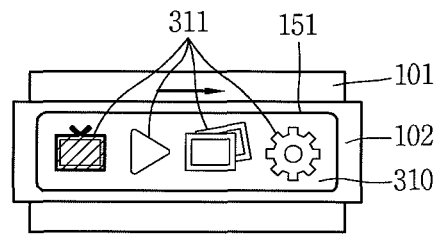
Figure 8D:
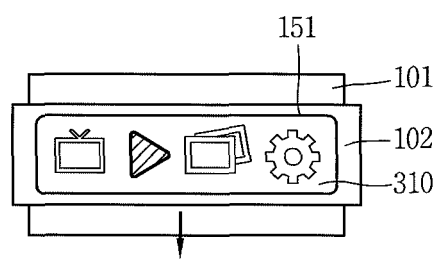
Figure 8D:
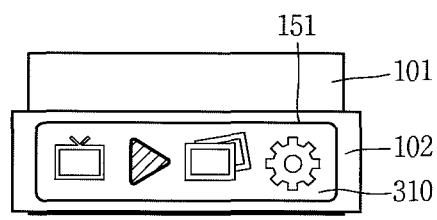
Figure 8D:
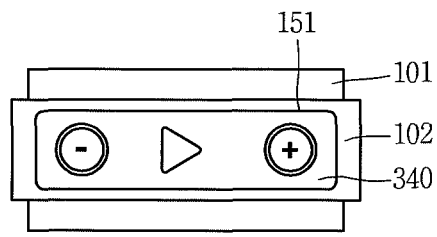

Next, in FIGS. 8D(a) to 8D(d), the first screen information 310 including the multiple icons 311 is output to the display unit 151. When the ring-type terminal 100 connects wirelessly to the mobile terminal 200, the multiple icons 311 correspond to multiple functions for controlling the mobile terminal 200, respectively. With the rotation of the wheel 102 in one direction, the controller 180 selects one icon, and the selected icon on the display unit 151 is highlighted so the user can identify the selected icon.

When one icon is selected, and when the wheel 102 moves in a specific direction, the controller 180 performs a function corresponding to the icon. Further, the controller 180 controls the display unit 151 so a control screen 340 relating to the function is output. For example, when the wheel 101 moves away and returns to the middle of the main body 101, the controller 180 controls the display unit 151 to display the control screen 340.

That is, when the icon is selected, the controller 180 transmits a control command to the mobile terminal 200 in order to perform a corresponding function, and displays the control screen 340 for controlling the function. Further, the control screen 340 includes multiple graphic images that receive the user touch input in order to control the function.

That is, the ring-type terminal according to an embodiment of the present invention selects a function to be performed using the wheel 102, and also controls the selected function. A control method of selectively performing multiple functions with the rotation and the movement of the wheel 102 will be described in detail below.

Figure 9A:
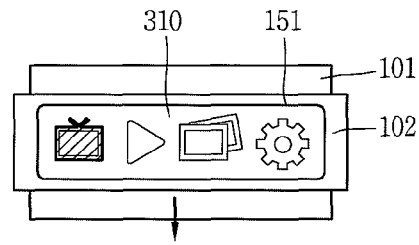
FIGS. 9A(a) to 9D(b) are diagrams illustrating a method of performing and controlling a function using the wheel in the first mode.
Figure 9A:
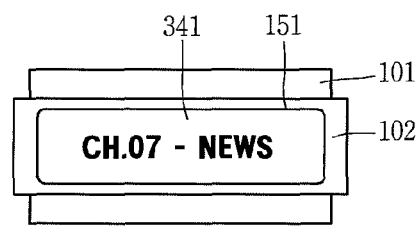
Figure 9A:
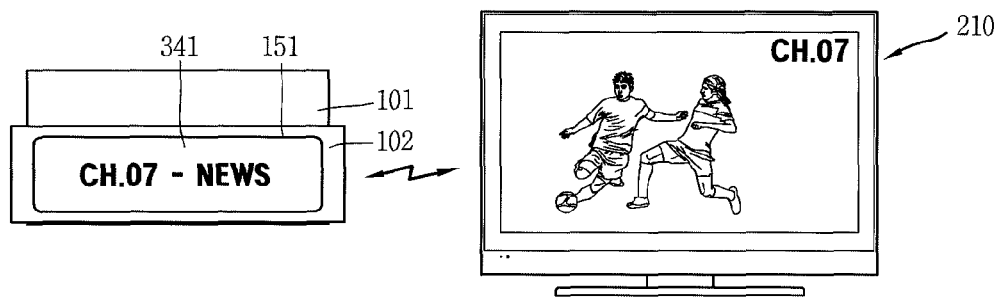
Figure 9A:
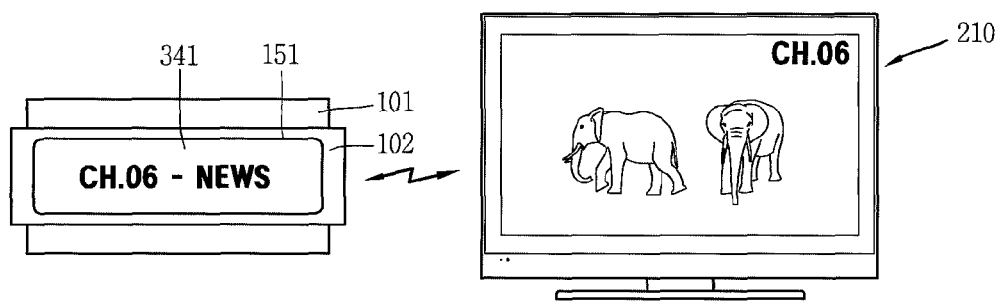

Next, FIGS. 9A(a) to 9D(b) are diagrams illustrating a method of performing and controlling a function using the wheel 102 in the first mode. Referring to FIGS. 9A(a) to 9A(d), the controller 180 performs the function corresponding to the selected icon. For example, the function corresponds to outputting a broadcast screen using a broadcast signal in the external apparatus 210.

With the wheel 102 that moves in a specific direction, the controller 180 performs the function. Then, the wheel 102 returns to the middle of the main body 101, the controller 180 controls the display unit 151 so a first control information 341 is output. In addition, the first control information 341 includes information on the performed function. Further, the control information 341 includes channel information, broadcast category information, and the like on a broadcast screen output from the external apparatus 210.

When the first control information 341 is output, and with the movement of the wheel 102, the controller 180 controls the wireless communication unit 110 so a control command for changing the channel is transmitted to the external apparatus 210. When, based on the control command, a channel for the broadcast screen output from the external apparatus 210 is changed, the controller 180 controls the display unit 151 so the changed channel information and the like are output to the first control information 341.

Figure 9B:
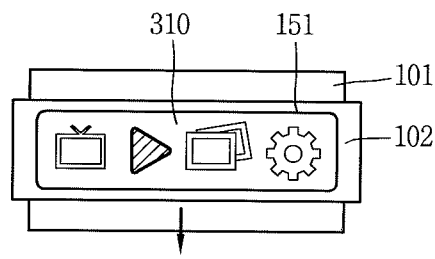
Figure 9B:
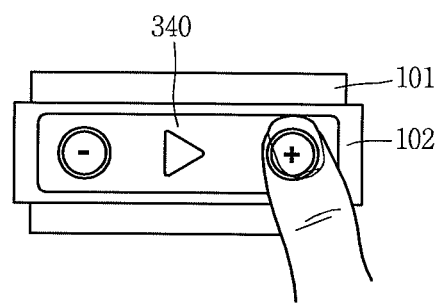
Figure 9B:
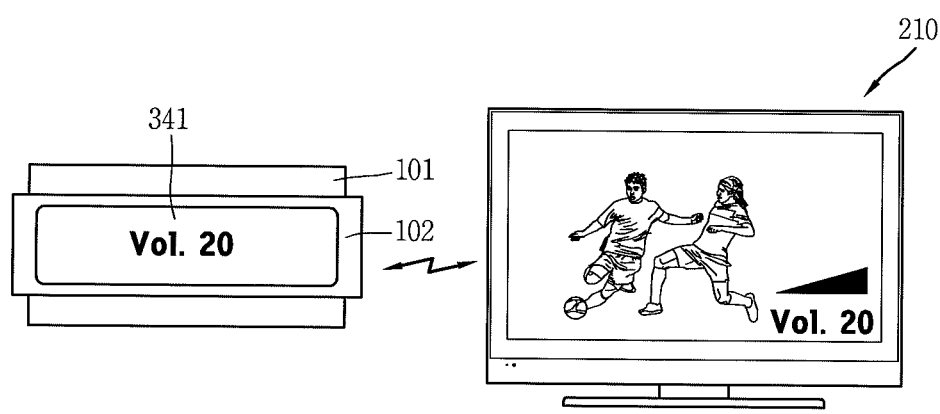

A method of controlling a function with the touch input is described referring to FIGS. 9B(a) to 9B(c). When the first screen information 310 is output, the controller 180 generates a control command for performing function corresponding to one icon selected according to the movement of the wheel 102. When the function is performed based on the control command, the controller 180 displays the control screen 340 on the display unit 151. The control screen 340 includes multiple graphic images that receive the touch input in order to control the performed function.

With the touch input applied to the graphic image, the controller 180 transmits a control command for controlling the function to the external apparatus 210. In addition, the controller 180 controls the display unit 151 so the first control information 341 which is changed according to the control command is output. The first control information 341 is output for a given period of time, and then the control screen 340 is returned.

Figure 9C:
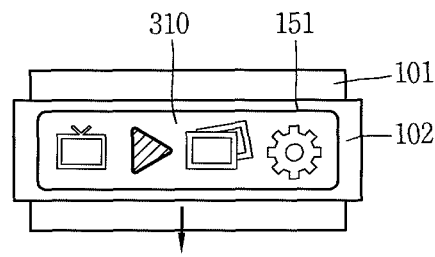
Figure 9C:
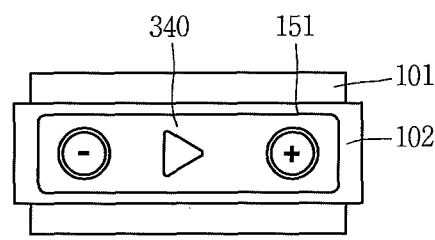
Figure 9C:
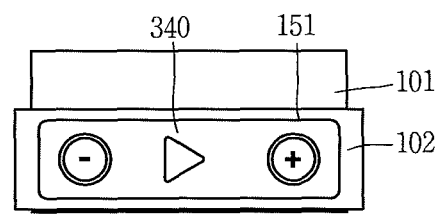
Figure 9C:
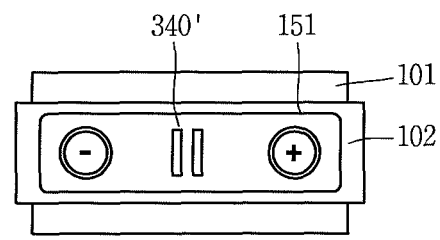

A method of controlling a function with the movement of the wheel 102 is described referring to FIGS. 9C(a) to 9C(d). When the first screen information 310 is output, the controller 180 generates a control command for selecting and performing one function according to the movement of the wheel 102. Based on the control command, the controller 180 switches the first screen information 310 to the control screen 340. For example, the control screen 340 includes multiple graphic images for performing a function of running a media file, for example, for playing back and temporarily stopping the media file, and for adjusting a sound volume.

When the control screen 340 is output, and with the movement of the wheel 102, the controller 180 generates a control command for performing a first function among the functions. For example, the first function corresponds to the playback of the media file. When the control command corresponding to the first function is generated and the wheel 102 moves to the middle of the main body 101, the controller 180 controls the display unit 151 so a changed modification control screen 340' is output to a graphic image corresponding to the first function. However, according to the present embodiment, the controller 180 generates the control command with the touch input applied to the graphic image.

Figure 9D:
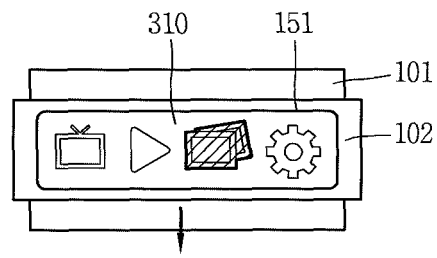
Figure 9D:
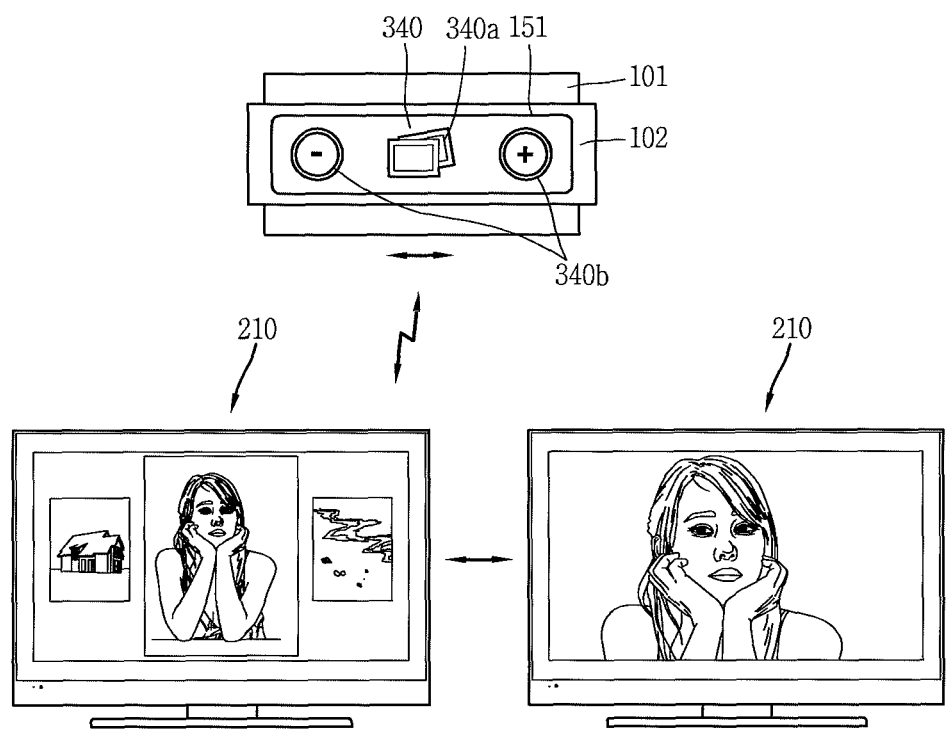

A control method of controlling a function with the rotation of the wheel 102 is described referring to FIGS. 9D(a) and 9D(b). When the first screen information 310 is output, and with the movement of the wheel 102, a function is performed and the control screen 340 corresponding to the function is output.

Further, the control screen 340 includes a function image 340a indicating the function and a pair of graphic images 340b indicating opposite second functions, respectively, which are arranged with the function image 340a in between. For example, when the function corresponds to a gallery application that outputs a photograph, the second functions indicated by the graphic images 340b correspond to enlargement and reduction of a selected photograph, respectively.

In addition, the controller 180 receives the touch input applied to the graphic image, and generates a control command that enlarges and reduces the photograph. In addition, the controller 180 generates a control command for enlargement and reduction based on the direction in which the wheel 102 rotates. Accordingly, while the control screen or the control information is output, the selected function is controlled by applying the touch input to the display unit 151 and some functions are controlled with the movement and the rotation of the wheel 102.

Figure 10A:
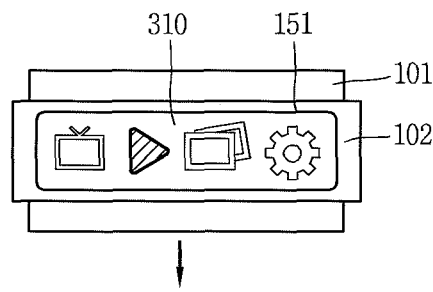
FIGS. 10A(a) to 10D(d) are diagrams illustrating a control method of controlling a function with movement and rotation of the wheel.
Figure 10A:
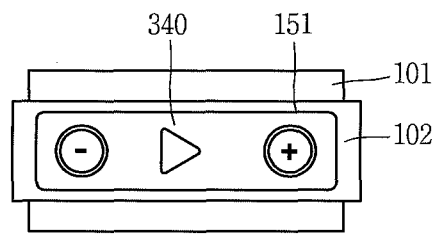
Figure 10A:
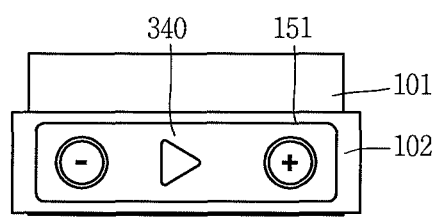
Figure 10A:
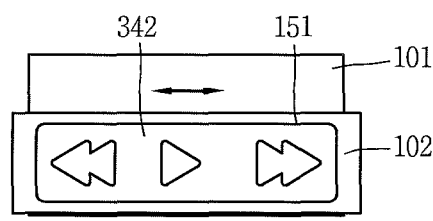
Figure 10A:
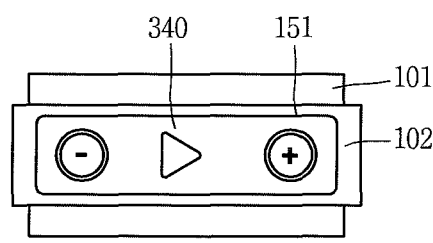

A control method of controlling a function with the movement and the rotation of the wheel 102 is described referring to FIGS. 10A(a) to 10D(d). When the wheel 102 rotates in a moved state, the controller 180 generates a control command for performing a different given function. The different function corresponds to a different function of the executed application, but is not limited to this.

FIGS. 10A(a) to 10(e) illustrates examples of performing a function of playing back the media file with the movement of the wheel 102. Referring to FIGS. 10A(c) and 10A(d), while the wheel 102 maintains the moved state while the control screen 340 is output, the controller 180 controls the display unit 151 so the second control information 342 is output. In addition, the maintaining of the moved state means maintaining of a state where the wheel 102 moves and is positioned adjacent to one edge of the main body 102.

For example, the second control information 340 includes a graphic image for changing a playback segment of the selected media file. The user can rotate the wheel 102 while maintaining the moved state so the second control information 340 is output. When the wheel 102 rotates while maintaining the moved state, the controller 180 selectively controls a function included in the second control information 340. For example, when the wheel 102 rotates to the right while maintaining the moved state, the controller 180 generates a control command for forwarding the media file. When the moved state is canceled, the controller 180 controls the display unit 151 so the second control information 342 switches to the control screen 340.

Figure 10B:
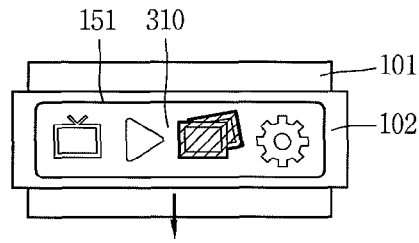
Figure 10B:
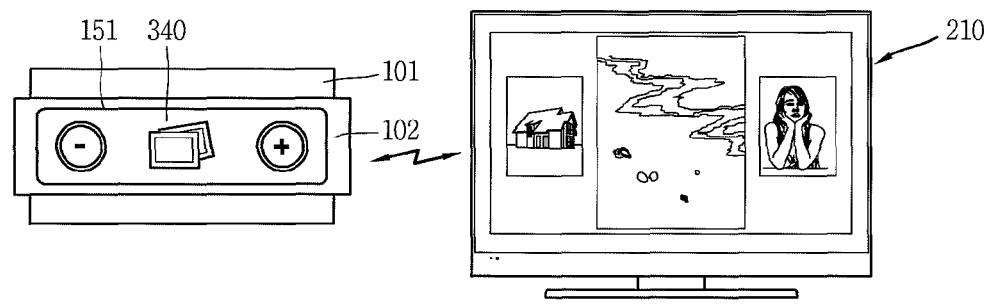
Figure 10B:
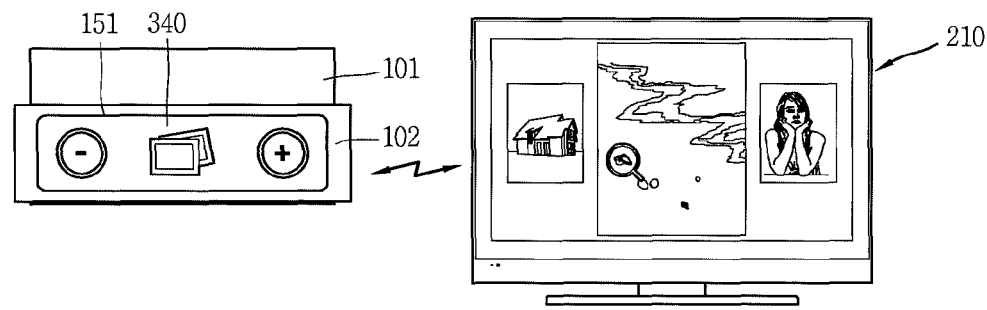
Figure 10B:
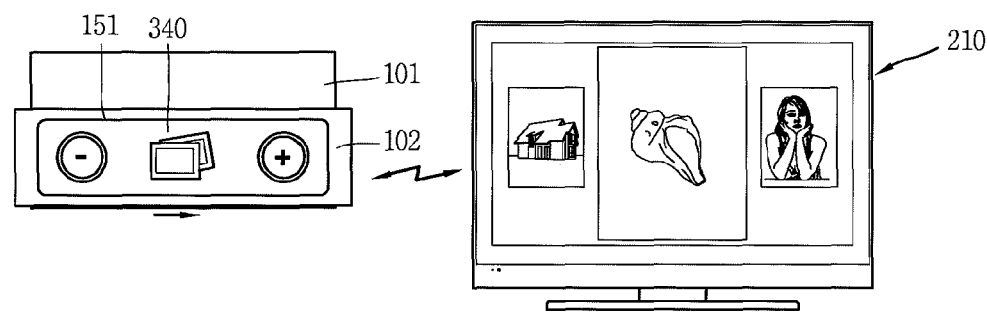

A control method when the gallery application is executed in the external apparatus 210 is described referring to FIGS. 10B(a) to 10B(d). When the wheel 102 rotates in the moved state when one photograph is selected from among multiple photographs on the external apparatus 210, with the rotation of the wheel 102, the controller 180 generates a control command for selecting a different photograph. That is, with the movement and the rotation of the wheel 102, a photograph that precedes or follows a current photograph is selected from among multiple photographs that are sequentially arranged.

Figure 10C:
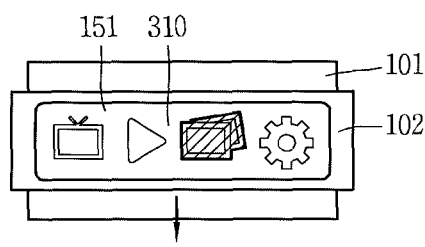
Figure 10C:
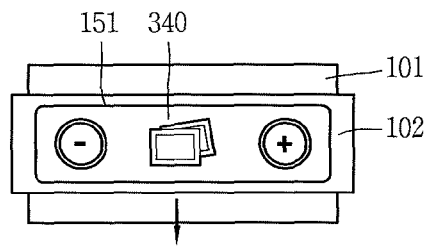
Figure 10C:
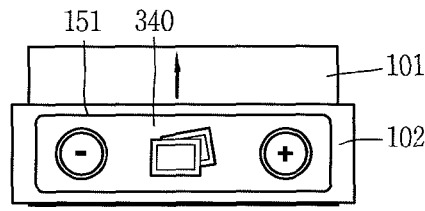
Figure 10C:
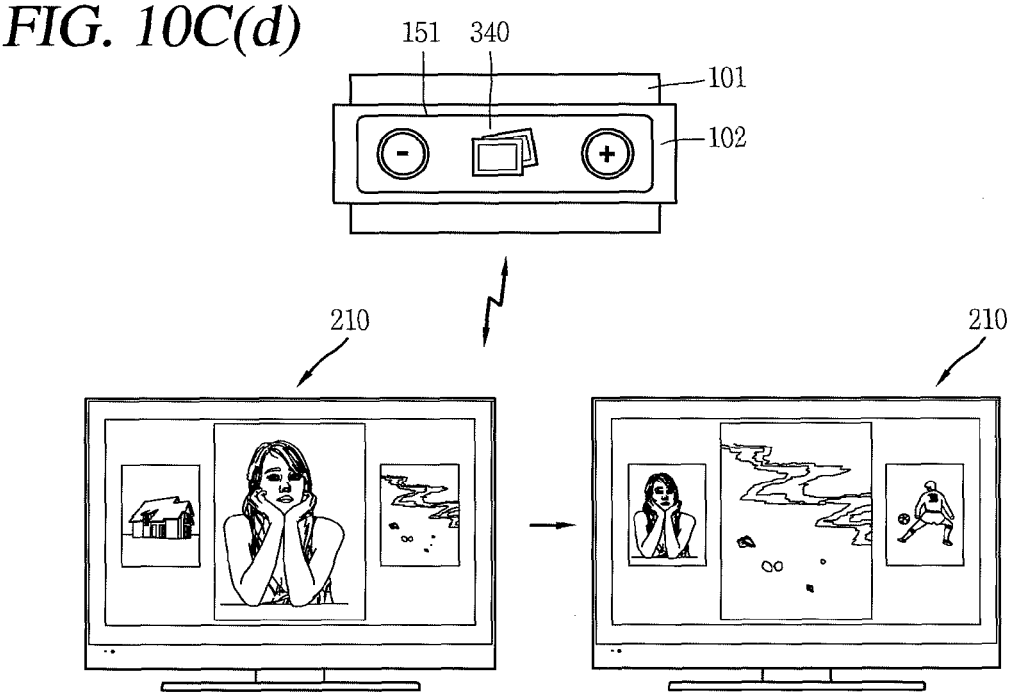
Figure 10D:
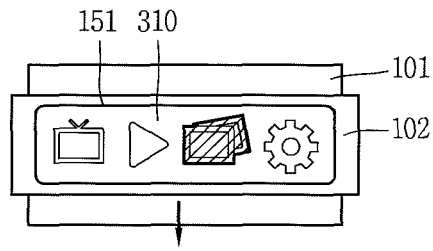
Figure 10D:
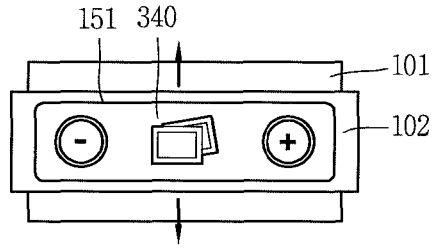
Figure 10D:
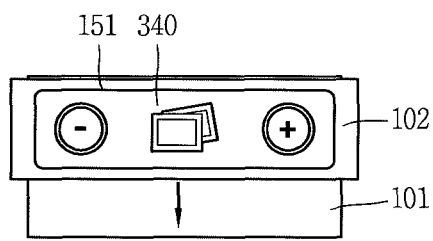
Figure 10D:
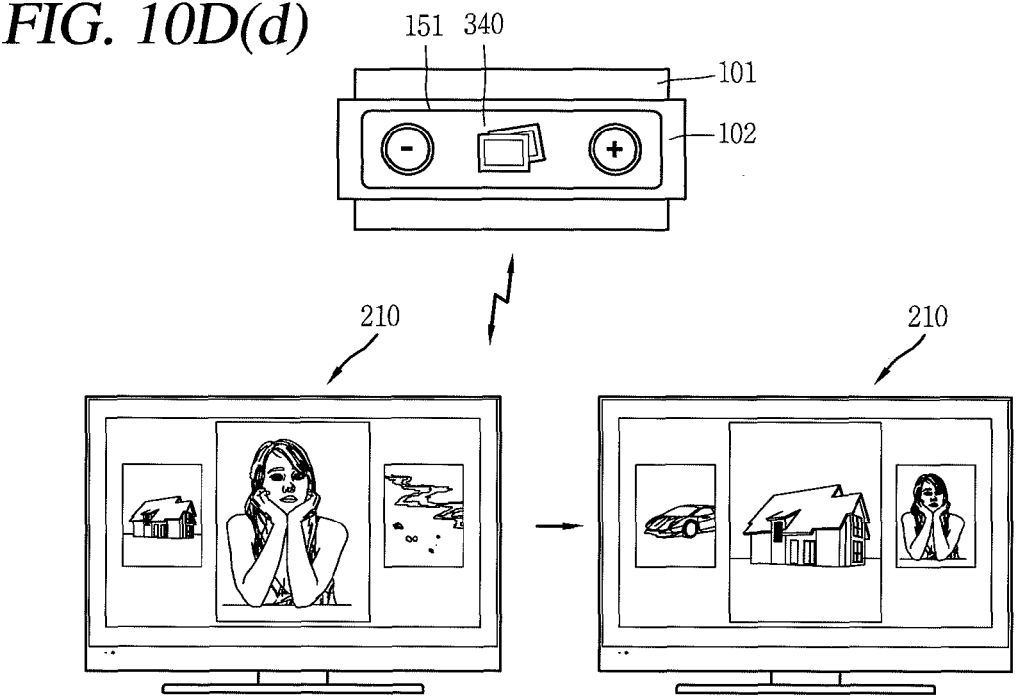

A control method of selecting the photograph according to another embodiment is described referring to FIGS. 10C(a) to 10D(d). When the first screen information 310 is output, the controller 180 selects one function according to the movement of the wheel 102, and controls the display unit 151 so the control screen 340 corresponding to the function is output.

When the control screen 340 is output, and with the movement of the wheel 102, the controller 180 controls the function. For example, the selected function corresponds to the gallery application, and thus multiple photographs are sequentially arranged on the external apparatus 210 and one photograph is selected from among the multiple photographs.

Referring to FIGS. 10C(c) and 10D(c), with the movement of the wheel 102 in different directions, the controller 180 generates a control command for selecting a photograph that precedes or follows the selected photograph. According to the present embodiment, not only with the rotation of the wheel 102, but also with the movement of the wheel 102, the function is controlled, and a type of fiction controlled according to the movement of the wheel 102 is changed by a user setting. In addition, a function corresponding to the rotation of the wheel 102 is displayed on the display unit 151.

Figure 11A:
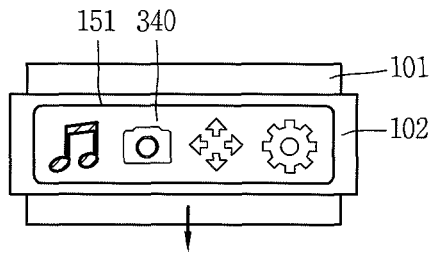
FIGS. 11A(a) to 11D(d) are diagrams illustrating a control method of controlling a function using the wheel according to another embodiment.
Figure 11A:
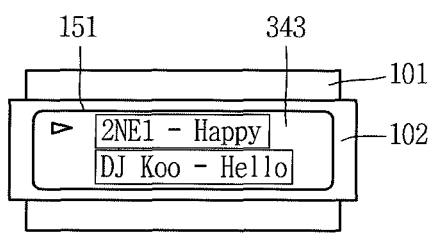
Figure 11A:
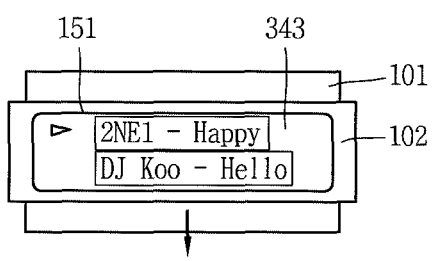
Figure 11A:
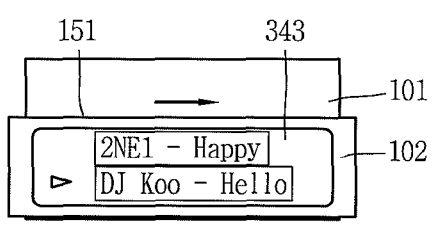
Figure 11A:
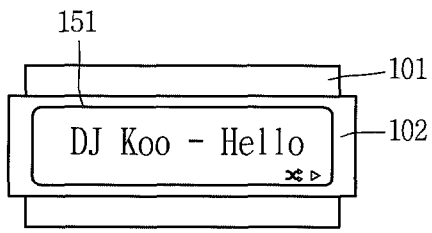

Next, FIGS. 11A(a) to 11C(c) are diagrams illustrating a control method of controlling a function using the wheel 102 according to another embodiment. Referring to FIGS. 11A (a) to 11A(e), while the control screen 340 is output, and with the movement of the wheel 102, the controller 180 controls the display unit 151 so the third control information 343 is output. For example, with the movement of the wheel 102, the function of playing back the media file is performed, and the third control information 343 may be a content list. For example, the third control information 343 includes information on multiple media files to be played back, and indicated a media file currently played back. In addition, it is preferable that the multiple items of content on the list are arranged along a direction in which the wheel 102 can move.

When the third control information 343 is output, the controller 180 selects one item of content from among the items of content on the list according to the movement of the wheel 102. When the wheel 102 moves away and returns to its original position, the controller 180 generates a control command that plays back one selected item of content from among the items of content on the list.

Accordingly, when multiple items of content that can be selected by performing one function are present, the wheel 102 moves to select the multiple items of content. A control method of controlling a camera function of the mobile terminal 200 using the ring-type terminal 100 is described referring to FIGS. 11B to 11C(c).

Figure 11B:
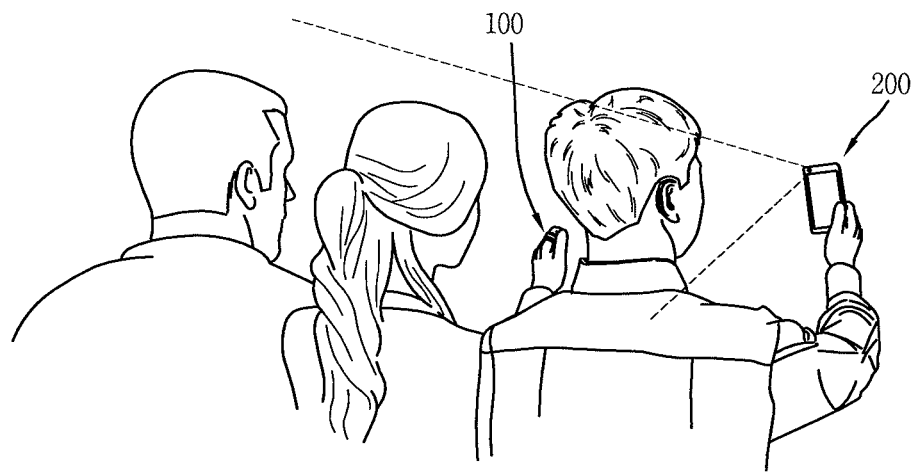

In particular, FIG. 11B is a diagram illustrating a control method of controlling a function of a front-side camera using the ring-type terminal 100 worn on a finger of one hand of the user with the front-side camera of the mobile terminal 200 gripped with the other hand. Accordingly, the user can conveniently control various functions of the camera using the ring-type terminal worn on the finger of the one hand, without applying a control command with the other hand supporting the mobile terminal 100.

Figure 11C:
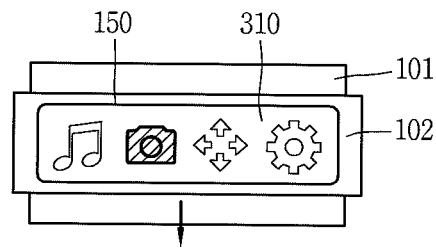
Figure 11C:
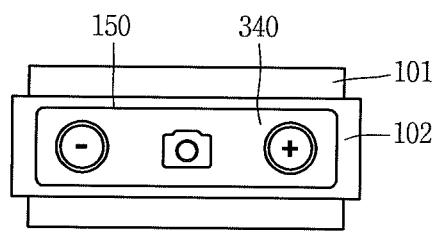
Figure 11C:
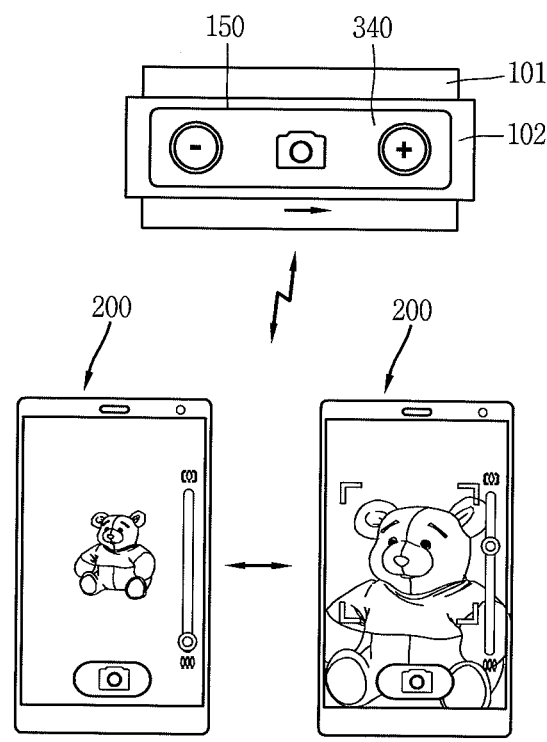

Referring to FIG. 11C(a) to 11C(c), with the movement of the wheel 102, the controller 180 selects a function of the camera on the first screen information 310, and displays the control screen 340 on the display unit 151. The control screen 340 includes an icon corresponding to a zoom-in function and a zoom-out function of the camera.

When the control screen 340 is output, and with the rotation of the wheel 102, the controller 180 performs the zoom-in function or the zoom-out function of the camera. Accordingly, control is performed so a preview image which is displayed on the mobile terminal 200 is enlarged or reduced.

Figure 11D:
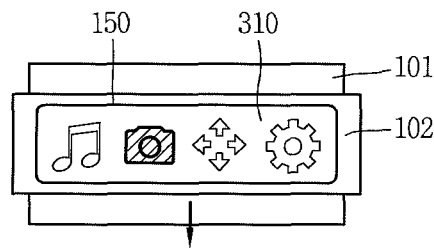
Figure 11D:
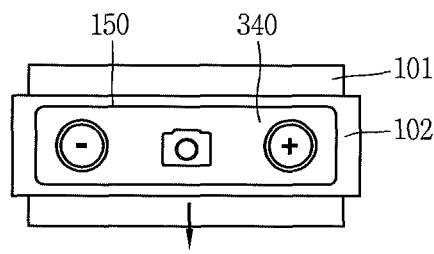
Figure 11D:
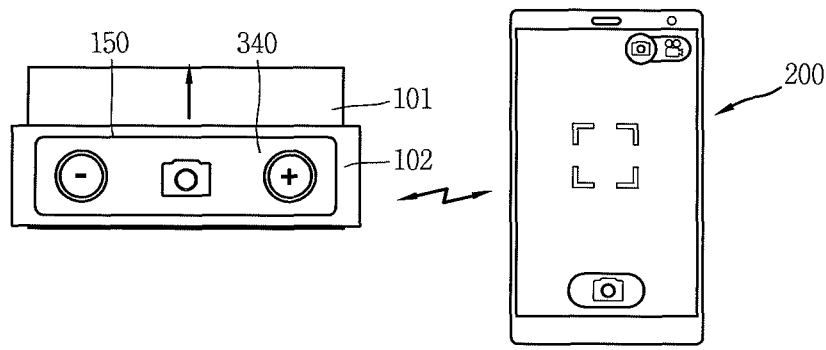
Figure 11D:
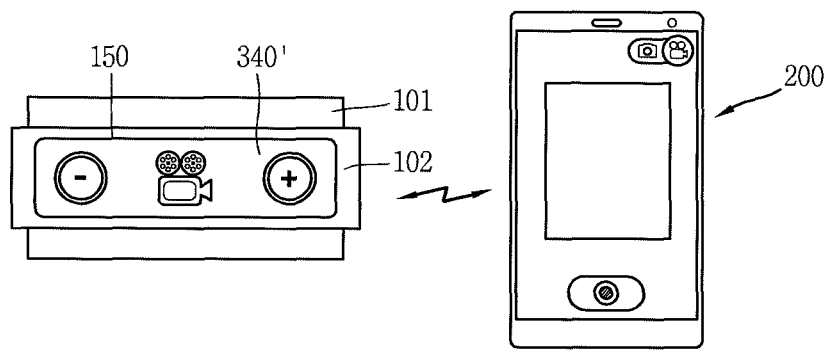

Referring to FIG. 11D, with the movement of the wheel 102, the controller 180 selects the function of the camera on the first screen information 310, and displays the control screen 340 on the display unit 151. The control screen 340 includes an image corresponding to a photographing function among various functions of the camera. With the movement of the wheel 102, the controller 180 generates a control command for switching the photographing function to a moving-image capturing function. In addition, the modification control screen 340' including an image corresponding to the moving image capturing function is output to the display unit 151.

That is, with the movement of the wheel 102, the controller 180 activates different functions of substantially the same application. In addition, with the movement of the wheel 102 in a different direction or the reciprocation of the wheel 102, an initial function is reactivated or a different function is activated.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A ring-type terminal comprising:
a main body including a finger insertion space;
a wireless communication unit;
a wheel surrounding the main body and being movable and rotatable on the main body;
a touchscreen disposed on a portion of the wheel and being rotatable with the wheel; and
a controller configured to:
display, via the touchscreen, screen information including icons corresponding to multiple functions for controlling an external device when the ring-type terminal connects wirelessly to the external device;
select one icon according to a movement of the wheel;
control the wireless communication unit to transmit a control command to the external device in order to perform a function of the external device corresponding to the selected icon; and
display, via the touchscreen, a control information including information on the performed function based on the control command.

2. The ring-type terminal according to claim 1, further comprising:
a first sensor included in an internal space of the main body and configured to sense the rotated position of the wheel on the main body; and
a second sensor included in the internal space of the main body and configured to sense a movement of the wheel on the main body.

3. The ring-type terminal according to claim 2, wherein the wheel includes a first portion exposed to the outside at an external surface of the main body and second and third portions mounted in the internal space, and
wherein a cross-sectional area of the third portion is greater than that of the second portion.

4. The ring-type terminal according to claim 3, wherein the wheel moves along one direction defined as a direction through which a finger is inserted, and
wherein the wheel further includes an elastic portion mounted on both ends of the second portion so the elastic portion is supported by the main body and elastically supports the wheel in the one direction.

5. The ring-type terminal according to claim 4, further comprising:
a ring-shaped rolling portion provided between the main body and the third portion for the rotation of the wheel,
wherein the internal space includes a first space in which the second and third portions are accommodated, and a second space accommodating the first space and the ring-shaped rolling portion.

6. The ring-type terminal according to claim 5, wherein the rolling portion includes a first rotation ring mounted on the third portion and a second rotation ring arranged between the first rotation ring and an internal surface of the main body and having a smaller cross section than the first rotation ring.

7. The ring-type terminal according to claim 3, wherein the second sensor includes a magnet mounted on an internal surface of the main body and pair of spaced apart magnetic sensors in one direction on one surface of the third portion.

8. The ring-type terminal according to claim 7, further comprising:
an impact-absorbing unit arranged between a different surface of the third portion and the internal surface of the main body to absorb an impact of the wheel on the main body.

9. The ring-type terminal according to claim 3, further comprising:
a rolling portion for rotating the wheel arranged between the third portion and the main body,
wherein the third portion has a groove in which at least one part of the rolling portion is accommodated.

10. The ring-type terminal according to claim 9, further comprising:
an elastic support unit arranged in the internal space so as to face the third portion and configured to elastically support the rolling portion,
wherein the elastic support unit includes an elastic member mounted on the main body, and a support member supported by the elastic member and of which one surface has a curved surface and faces the third portion.

11. The ring-type terminal according to claim 10, further comprising:
a prevention unit formed between the first portion and the main body and configured to prevent contaminants from being introduced into the internal space.

12. The ring-type terminal according to claim 3, wherein the first sensor is mounted on an internal surface of the main body so both surfaces of the second portion which face the first sensor come into contact with the first sensor.

13. The ring-type terminal according to claim 1, further comprising:
a recognition module mounted on one portion of the main body and one portion of the wheel and configured to indicate the rotated position of the wheel.

14. The ring-type terminal according to claim 13, wherein the recognition module includes multiple grooves formed in an external circumferential surface of the main body.

15. The ring-type terminal according to claim 1, wherein the controller is further configured to display time information output on the touchscreen, and
wherein the touchscreen is disposed between the main body and the wheel, and at least one portion of the wheel includes transparent material such that the time information is visible through the transparent material.

16. The ring-type terminal according to claim 1, wherein the touchscreen is mounted in a recessed portion of the wheel such that external surfaces of the touchscreen and the wheel are substantially flush.

17. The ring-type terminal according to claim 1, wherein the wheel rotates in a first direction and moves in a second direction perpendicular to the first direction.

* * * * *